United States Patent
Niv et al.

(10) Patent No.: US 12,008,222 B1
(45) Date of Patent: Jun. 11, 2024

(54) UNSUPERVISED DETECTION OF SECURITY INCIDENTS IN A CLOUD ENVIRONMENT

(71) Applicant: Rapid7 Israel Technologies Limited, Tel Aviv (IL)

(72) Inventors: Nitzan Niv, Nesher (IL); Gad Naor, Tel Aviv (IL)

(*) Notice: Subject to any disclaimer, the term of this patent is extended or adjusted under 35 U.S.C. 154(b) by 0 days.

(21) Appl. No.: 17/979,122

(22) Filed: Nov. 2, 2022

Related U.S. Application Data

(63) Continuation-in-part of application No. 17/590,221, filed on Feb. 1, 2022, now Pat. No. 11,818,014, which
(Continued)

(51) Int. Cl.
*G06F 3/0484* (2022.01)
*G06F 9/54* (2006.01)
*G06N 7/01* (2023.01)
*G06N 20/00* (2019.01)
*G06Q 30/0251* (2023.01)
(Continued)

(52) U.S. Cl.
CPC ............ *G06F 3/0484* (2013.01); *G06F 9/546* (2013.01); *G06N 7/01* (2023.01); *G06N 20/00* (2019.01); *G06Q 30/0271* (2013.01); *H04L 41/142* (2013.01); *H04L 41/145* (2013.01); *H04L 43/062* (2013.01); *H04L 63/102* (2013.01); *H04L 63/104* (2013.01); *H04L 63/1416* (2013.01); *H04L 63/1425* (2013.01);
(Continued)

(58) Field of Classification Search
CPC ............... G06F 3/0484; G06F 16/9024; G06F 3/04842; G06F 16/254; G06F 16/24578; G06F 40/134; G06F 3/0482; G06F 16/285; G06F 16/444; G06F 3/04847; G06V 10/225; H04L 63/1433; H04L 43/062; H04L 63/1441; H04L 43/045; H04L 43/00; H04L 41/0893; H04L 63/20; H04L 43/08; H04L 63/1408; H04L 63/1425; H04L 41/145; H04L 41/22; H04L 63/1416; H04L 63/06; G06N 7/01; G06N 5/022; G06N 5/04; G06N 20/20; G06N 20/00; H05K 999/99
See application file for complete search history.

(56) References Cited

U.S. PATENT DOCUMENTS 9,516,053 B1 * 12/2016 Muddu ................ G06F 3/0484
11,425,149 B2    8/2022 Niv et al.
(Continued)

OTHER PUBLICATIONS

Rienstra, "Ranking Theory", Aug. 2018, pp. 10-16.
(Continued)

*Primary Examiner* — Kyung H Shin
(74) *Attorney, Agent, or Firm* — Wolf, Greenfield & Sacks, P.C.

(57) ABSTRACT

Various embodiments include systems and methods to implement a security platform providing cyberattack detection. The security platform may, with respect to a cloud compute environment, use audit log data that is associated with a particular domain of operational activity within the cloud compute environment. Based on a domain specific graph representative of factor data and dependencies between factor data, the security platform may determine a behavioral anomaly that is associated with a cyberattack.

19 Claims, 10 Drawing Sheets

Related U.S. Application Data is a continuation of application No. 16/263,322, filed on Jan. 31, 2019, now Pat. No. 11,425,149.

(51) Int. Cl.
*H04L 9/40* (2022.01)
*H04L 41/14* (2022.01)
*H04L 41/142* (2022.01)
*H04L 43/062* (2022.01)
*H04L 67/30* (2022.01)
*H04W 12/06* (2021.01)

(52) U.S. Cl.
CPC .......... *H04L 63/1441* (2013.01); *H04L 67/30* (2013.01); *H04W 12/06* (2013.01)

(56) References Cited

U.S. PATENT DOCUMENTS

| | | | |
|---|---|---|---|
| 11,818,014 | B2 | 11/2023 | Niv et al. |
| 2013/0305357 | A1 | 11/2013 | Ayyagari et al. |
| 2016/0078365 | A1 | 3/2016 | Baumard |
| 2016/0125304 | A1* | 5/2016 | Pizurica .................. G06N 7/01 706/52 |
| 2017/0262325 | A1 | 9/2017 | Liisberg |
| 2018/0047065 | A1 | 2/2018 | Wildberger |
| 2019/0132344 | A1 | 5/2019 | Lem et al. |
| 2020/0057956 | A1 | 2/2020 | Phan et al. |
| 2020/0195670 | A1 | 6/2020 | Deardorff et al. |
| 2020/0252416 | A1 | 8/2020 | Niv et al. |
| 2022/0159025 | A1 | 5/2022 | Niv et al. |

OTHER PUBLICATIONS

Scarfone et al., "Guide to Intrusion Detection and Prevention Systems (IDPS)", NIST—National Institute of Standards and Technology, Special Publication No. 800-94, Feb. 2007, pp. 1-127.

Spohn, et al., "A Survey of Ranking Theory", KOPS—Konstanzer Online Publications, 2009, pp. 185-228.

* cited by examiner

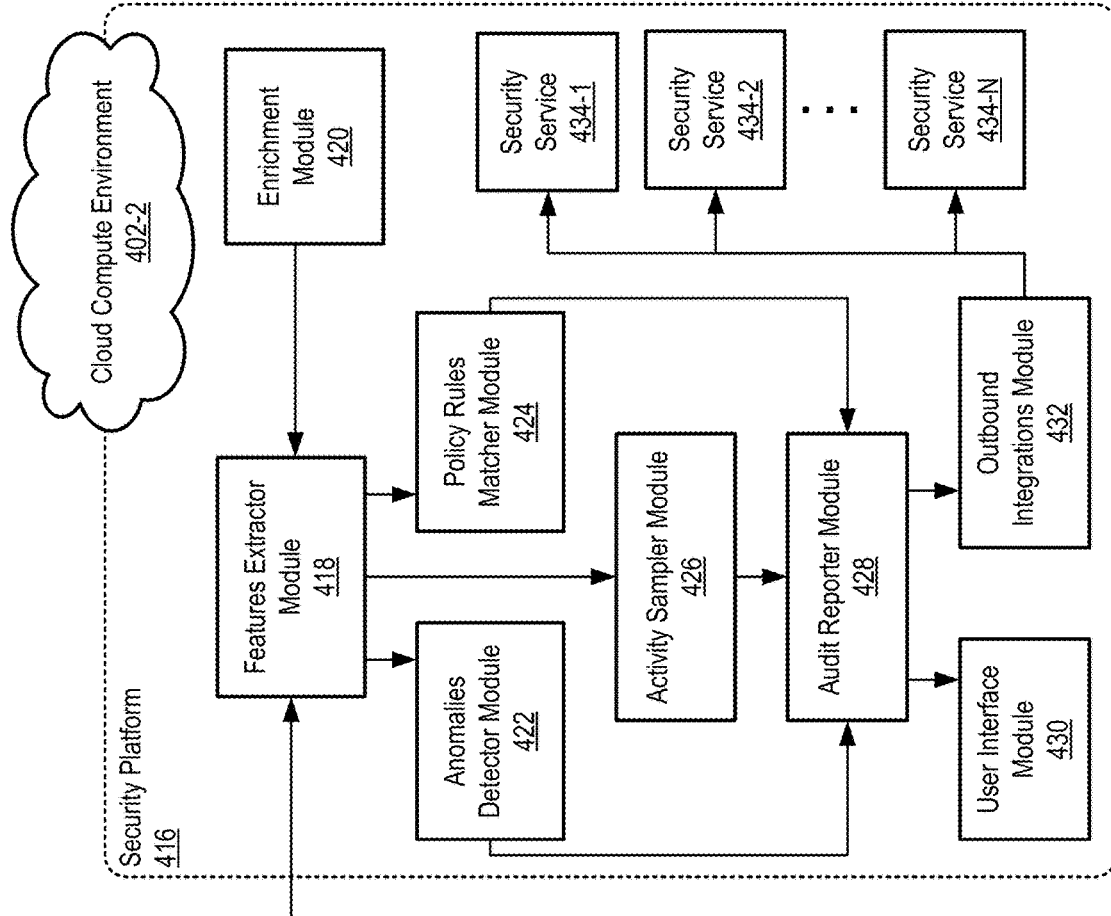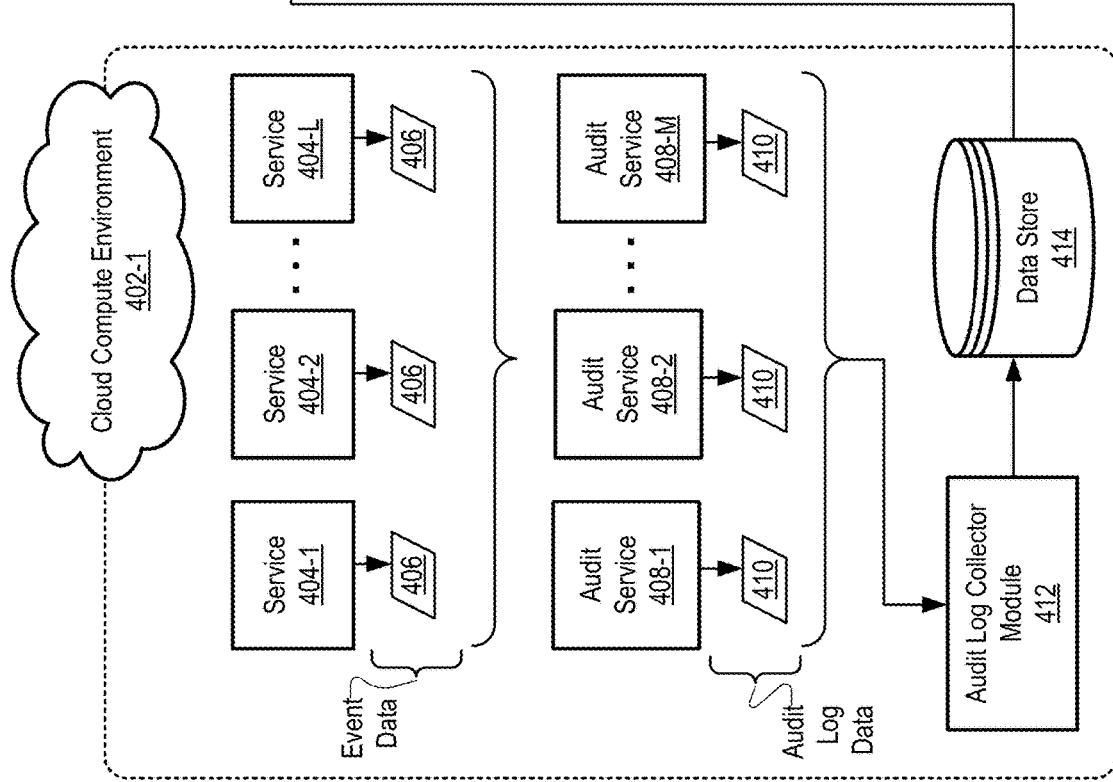
FIG. 4

900

Determine, based on first audit log data, a plurality of baseline profiles associated with operational activity within a cloud compute environment, where the plurality of baseline profiles is associated with a probabilistic graph.
910

Determine, based on second audit log data, one or more updates to the probabilistic graph.
920

Determine, based on third audit log data and on one or more probabilistic dependencies associated with the probabilistic graph, a number of deviations of operational activity.
930

Determine, based on the number of deviations being greater than a threshold value, detection data indicative of a cyberattack.
940

Generate, based on the detection data, an alert indicative of the cyberattack.
950

FIG. 9

UNSUPERVISED DETECTION OF SECURITY INCIDENTS IN A CLOUD ENVIRONMENT

CROSS-REFERENCE TO RELATED APPLICATIONS

This application is a continuation-in-part of U.S. patent application Ser. No. 17/590,221, filed Feb. 1, 2022, titled "Multi-Baseline Unsupervised Security-Incident and Network Behavioral Anomaly Detection in Cloud-Based Compute Environments", which is a continuation of U.S. patent application Ser. No. 16/263,322, filed Jan. 31, 2019, each of which is hereby incorporated by reference in its entirety.

TECHNICAL FIELD

The present disclosure relates generally to cybersecurity, and more specifically to behavioral anomaly detection in cloud environments.

BACKGROUND

Modern enterprise's cloud operations often include many workloads running different services. Some services are under the jurisdiction and purview of development operations (DevOps), while others are owned by development alone. Services may be added, scaled up, scaled down, upgraded or removed at a fast pace. In such a complex and ever-changing environment, well-structured tier-based monitoring and management are essential. Properly handled, the different moving parts have well-defined, intent-based communications patterns that reveal a great deal about how they ought to be approached from a security perspective.

While policies-enforcing security features like microsegmentation and cloud-provider security groups limit the allowed network connections between potentially interacting applications' workloads, these security features cannot stop the abuse of the permitted connections by external attackers, internally deployed malware or malicious insiders. For example, a web server should be allowed to connect to the database used by the web application that the web server is exposing to the world, but if there is a vulnerability in this application, an attacker may exploit the vulnerability to gain access through it to the data in the database.

Modern attacks are often complex and comprised of multiple steps, where each step prepares the ground for the next step. Each step may begin with a search for information about a system's status, location or workload, and then continue with opportunistically exploiting a vulnerability in the discovered system parts to escalate or extend the system's compromise to its more sensitive data and resources.

Some traditional security protection methods may not be able to dynamically, rapidly and automatically adapt to changing attack vectors and changing potential attack targets. It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Some embodiments disclosed here include a method for detecting anomalous network activity. The method includes receiving configuration data and network activity observations for a set of virtual entities; creating a profile for each virtual entity in the set of virtual entities, when the virtual entity does not already have an associated profile; dynamically updating the virtual entity's profile with the virtual entity's network activity observations; and determining whether anomalies have been detected.

Some embodiments disclosed here include a system for system for detecting anomalous network activity in a based compute environment. The system comprises a processing circuitry; and a memory, the memory containing instructions that, when executed by the processing circuitry, configure the system to: receive configuration data and network activity observations for a set of virtual entities in the cloud-based compute environment; create a profile for each virtual entity in the set of virtual entities, when the virtual entity does not already have an associated profile; dynamically update the virtual entity of a profile with the respective network activity observations of the virtual entity; and determine whether anomalies have been detected.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 4 is a block diagram illustrating a security platform detecting security incidents in a cloud environment, in accordance with some embodiments.

FIG. 9 is a flowchart that illustrates an example of a platform detecting security incidents in a cloud environment, according to some embodiments.

Figure 1:
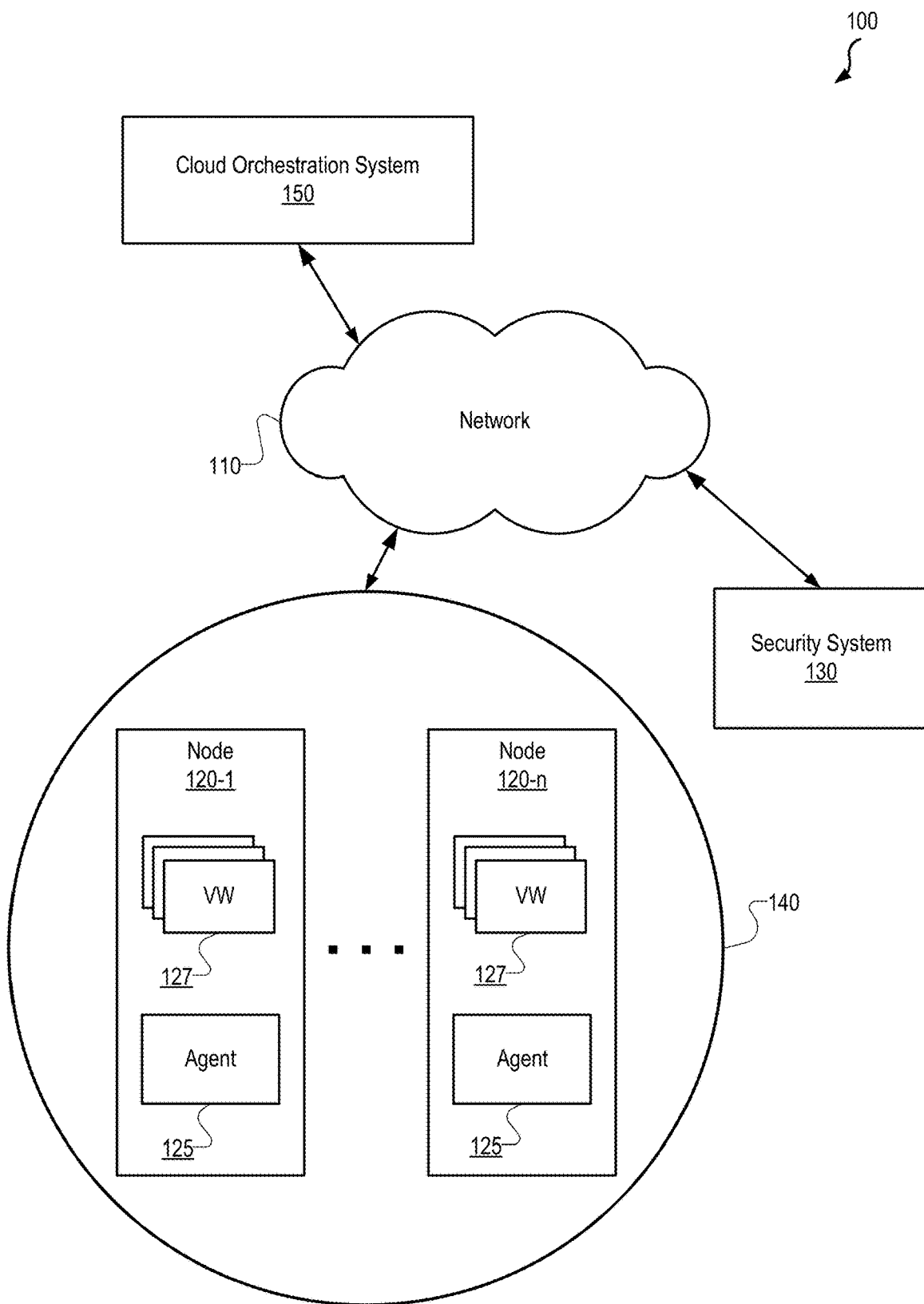
FIG. 1 illustrates an exemplary network diagram according to various disclosed embodiments.

While embodiments are described herein by way of example for several embodiments and illustrative drawings, those skilled in the art will recognize that embodiments are not limited to the embodiments or drawings described. It should be understood that the drawings and detailed description are not intended to limit embodiments to the particular form disclosed, but on the contrary, the intention is to cover all modifications, equivalents and alternatives falling within the spirit and scope as defined by the appended claims. As used throughout this disclosure, the word "may" is used in a permissive sense (i.e., meaning "having the potential to"), rather than the mandatory sense (i.e., meaning "must"). Similarly, the words "include," "including," and "includes" mean "including, but not limited to".

DETAILED DESCRIPTION OF EMBODIMENTS

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Some example embodiments, disclosed herein, include a method and system for network behavioral anomaly detection. One or more virtual workloads may be considered monitored entities. The security system may use probabilistic unsupervised learning methods such as forward propagation, feedback and backward propagation to identify expected network behavior of monitored entities and deviations from these expected profiles. The security system may process this information using one or more machine learning techniques directed by security expertise, which highlights unexpected network usage patterns and unusual data transfers initiated by workloads.

In some embodiments, a security system may create one or more models of the network activity of monitored entities, that may be used to represent their expected network behavior profile and to compare against observed behavior for detection of deviations. The model includes information from configurations relationships between entities, like memberships in entities groups, entities functional dependencies and deployment constraints as expressed in deployment configurations and co-deployment of entities on nodes. Furthermore, modeled relationships between entities include possible, allowed and used network paths between those entities, and the protocols and attributes of the content of the observed traffic between them. This learned model may be continuously updated using such factors as history of and change in network activity attributes, as well as deployment and orchestration configuration changes. In some embodiments, these models of entities and the sets of relationships between them may be represented as a graph.

In some embodiments, the system may categorize monitored entities into one or more groups. Such entities-groups include, for example: a group of entities which are executing the same application component (for example, multiple instances of the same partitioned database) or a group of entities that have the same applicative functionality (for example, all the databases of an application) or the group of entities that are all parts of the same application. A security system may create one or more models of the aggregated network activity of such entities-groups, that may be used to represent their expected network behavior profile and to compare against the observed behavior of the entities-group for detection of deviations. The system may also identify deviations between an entity's profile and the profiles of one or more of the entity-groups this entity is a member of. The system may update the learned model of an entities-group continuously according to monitored activity of the one or more of the group's member entities, using such factors as history of and change in network activity attributes, as well as deployment and orchestration configuration changes. In some embodiments, these models of entities-groups and the set of relationships between them may be represented as a graph.

In some embodiments, the system may categorize network connections between specific monitored entities into one or more connections-groups. Such connections grouping may be based, for example, on having similar activity attributes, being connections to or from a specific entity type like a database, being incoming connections from clients on the internet to the monitored application entities or being connections outgoing from monitored entities of an application to an external third-party service. A security system may create one or more models of the aggregated network activity observed on such connections-groups, that may be used to represent their expected network behavior profile and to compare against observed behavior for detection of deviations. The system may update the learned model of such connections-group continuously according to monitored activity on one or more of the group's member connections, using such factors as history and change in network activity attributes, as well as deployment and orchestration configuration changes. In some embodiments, these models of connections-groups and the set of relationships between them may be represented as a graph.

In some embodiments, deviations between the observed network activity of an entity and its expected network behavior profile, or deviations between the observed network activity of an entities-group and its expected network behavior profile, or deviations between the observed network activity of an entity and the expected network behavior profile of one or more of the entity-groups it belongs to, or deviations between the observed network activity on a network connection and the expected network behavior of one or more of the connections-groups it belongs to, may be considered a detection of anomalous network behavior and a possible indicator of a security incident.

In some embodiments, combinations of one or more of these detected abnormal behaviors of entities, entities-groups or connections-groups may be considered a detection of a security incident. Such potential combinations of anomalies detected at the entity, entities-group and connections-group levels in some embodiments provide detection of attacks that are either overlooked or undetected by traditional protection layers, including abnormal behaviors and security incidents such as DNS tunneling, spoofing attacks, caches poisoning, lateral movement of malware between system components, incoming connections from known malicious sources, reconnaissance of services deployed inside the data center from internal or external endpoints, unexpected changes in characteristics of data transfers between internal databases and internal, possibly compromised, processing workloads, and attempts by potentially infected services to connect to remote command and control servers or to exfiltrate sensitive information from the data center.

Some embodiments may report, log or inform users or monitoring systems about detected anomalies and incidents. Some embodiments may also offer protection against attacks that are detected by the attack detection engine. Such attack mitigations may be automatically applied according to the specific detected anomalies and incidents and the entities and connections on which they were detected.

FIG. 1 illustrates an example network diagram 100 utilized to describe the various disclosed embodiments. In the example network diagram 100, nodes 120-1 through 120-n (collectively referred to hereinafter as nodes 120 or individually as a node 120), and a security system 130, are communicatively connected via a local area network (LAN).

A node 120 may include, but is not limited to, a server or a hosting environment capable of executing one or more virtual workloads. In some embodiments, each node 120 may be a physical machine residing on a cloud computing platform 140.

The cloud computing platform 140 may include, but is not limited to, a public cloud, a private cloud, or a hybrid cloud. Examples for public cloud computing platforms may include Amazon Web Services™, Microsoft Azure™, and Google Cloud Platform™, and the like.

Each node 120 may be configured with an agent 125. The agent 125 collects runtime information on virtual entities workloads 127 executed within each node 120. This information may include configuration specification. This information includes the incoming and outgoing network activity of the workloads that are executing on the node and may also include the incoming and outgoing network activity of the node itself. The information may include additional local runtime and operating-system information related to the workload executing on the node, like memory, CPU, and disk usage, and system calls, caches hits and caches misses statistics. In case of an embodiment combining attacks detection with attacks mediation, the agent 125 may also be used according to the detection by security system 130 to limit, prevent, drop, report or modify the network activity of one or more of the workloads on the node or the activity of the node itself.

In an embodiment, monitored entities are virtual workloads, such as virtual machines (VM's), containers, microservices, serverless functions, pods and the like, or combination of some or all of these. In an embodiment, the virtual entities 127 are grouped to execute a single protected object. A monitored entity may be a web application, a cloud application, a micro-service and the like. It should be noted that a group of virtual entities 127 may include entities 127 executed over different nodes 120. That is, a group (hence, a protected object) may contain virtual entities 127 distributed across nodes 120 in the cloud platform 140. In an embodiment, the configuration of which virtual entities belong to which group is provided by a cloud orchestration system 150 or is part of the configuration available on nodes 120 of the entities 127 executing on them. It should be noted that groups are dynamically created and updated.

According to the disclosed embodiments, the security system 130 includes a component for network behavioral anomaly detection. The security system 130 also includes a component for extracting or receiving network activity information about each monitored entity from the respective agent 125 on its node 120, a component for extracting or receiving workloads deployment and configuration information from the orchestration system 150 or the entities' agents 125 or both. The security system 130 receives those inputs over the network 110. For example, the security system 130 may receive network activity features, deployment information, entities-groups features (such as network activity, deployment information, etc.), periodic features and/or changes relative to history for one or more profiles from nodes 120.

The security system 130 may communicate with the cloud orchestration system 150 to gather, receive, merge, filter and store cloud configuration information. For example, orchestration system 150 may indicate to security system 130 how many virtual machines are created, how many resources are needed, how many virtual resources are being taken down etc. The cloud orchestration system 150 may automate configuration, coordination, and management of virtual workloads executed on each node 120.

In some embodiments, security system 130 is configured to use probabilistic behavior learning to account for network anomalies. For example, security system 130 may use forward propagation and observations, as well as feedback and backward propagation, as part of the anomaly and incident detection.

Security system 130 uses unsupervised machine learning algorithms as described below for creating and continuously updating profiles of recent behavior of virtual workloads, workload-groups, connections-groups and nodes executed on a protected node.

In order to learn the profile of such an entity, security system 130 may receive data about the entity, its deployment characteristics and its network activity. Security system 130 may also extend the entity's profile with processed information about other entities that are related to the monitored entity, for example from deployment configurations describing multiple instances of the same base process, or network activity of other entities that are connected to the profiled entity. The profile models how the entity is likely to behave in the future based on the collected data.

The security system 130 may send one or more outputs to the nodes 120. For example, the security system 130 may send various data collection commands, detections indicators and mitigations commands to the agents 125 on the nodes 120 where incidents were detected.

In an embodiment, security system 130 may present one or more user interfaces. The user interfaces may present to a user abnormal network behavior (anomalies and incidents) detected by the security system 130, such as dashboards, reports, charts, tables, or other textual or graphical summaries. In some embodiments, the detected anomalies and incidents may be queried on behalf of the user through textual, graphical or application interfaces. In some embodiments, the identified anomalies and incidents may be passed to other systems for monitoring, notification or presentation.

It should be noted that the example implementation shown in FIG. 1 is described with respect to the nodes in a single cloud computing platform 110 merely for simplicity purposes and without limitation on the disclosed embodiments. More or fewer cloud computing platforms, data centers, or both, may be protected without departing from the scope of the disclosure.

Figure 2:
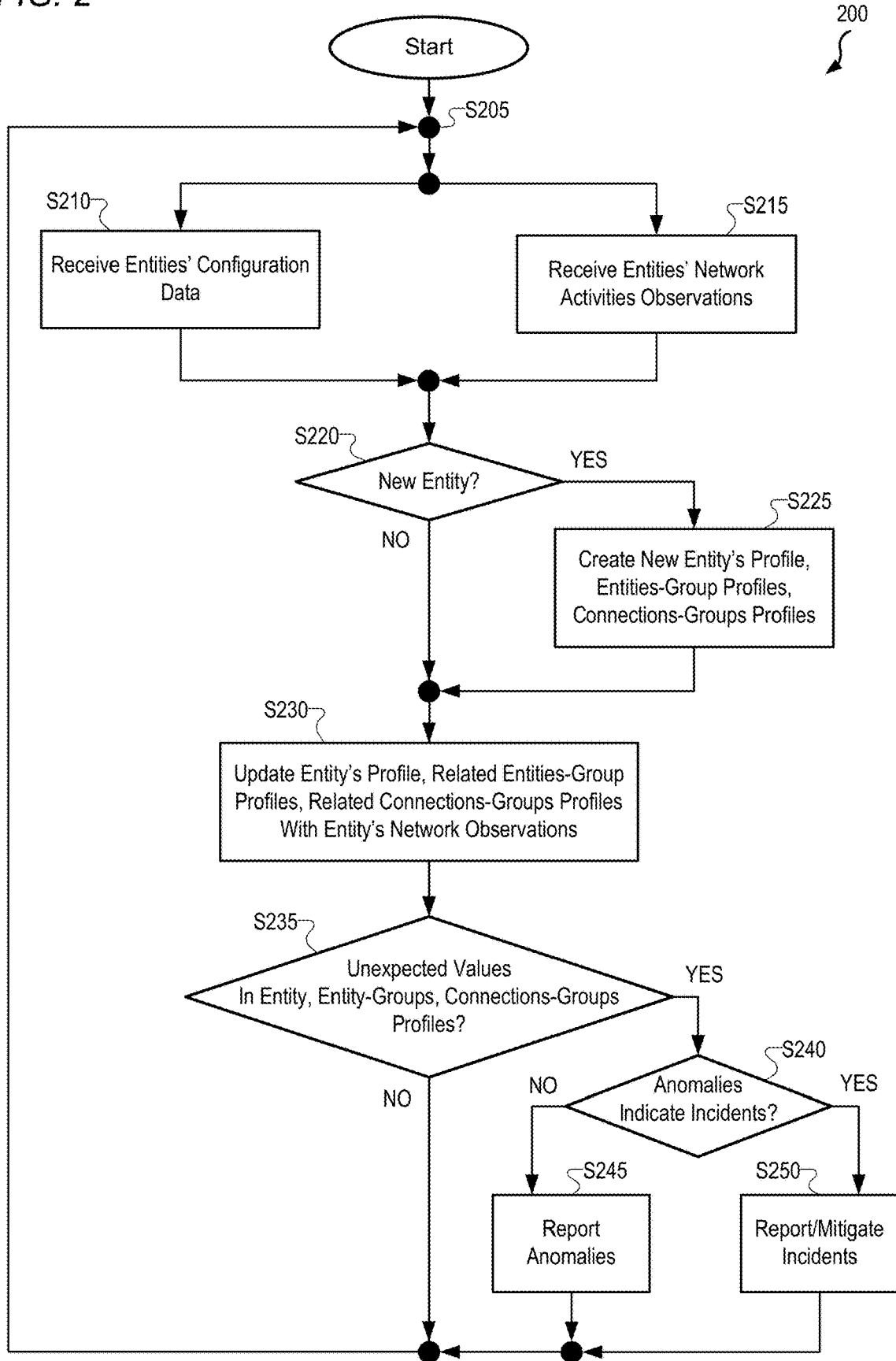
FIG. 2 illustrates a method of network behavior anomaly detection, according to some embodiments.

FIG. 2 illustrates an example flowchart 200 of a method for network behavior anomaly detection according to an embodiment. At S205, the system is ready to receive entities' configuration data and at S215 to receive entities' network activities observations.

At S210, configuration data is received from a cloud orchestration system and/or the system's agents. The configuration data indicates at least which virtual workloads are executing instantiations of a protected entity and on which nodes. Configuration data may also include additional information like scheduling constraints, network identifiers, network endpoints, software version, metadata tags and user annotations. An embodiment may learn from such configuration indicators that sets of virtual entities are designed to be executed together or have functional, scheduling, deployment or management dependencies on each other, for example, load sharing through adaptive scaling of multiple workload instances and load balancing between them, or high availability of a workload through redundancy of its workload instances, or functional decomposition of an application to interacting workloads. Using these configuration indicators, an embodiment may categorize entities into entities-groups that are expected to have similar network behavior. Using these configuration indicators, an embodiment may also categorize specific connections between entities to connections-groups that are expected to have similar network behavior. As configuration data is continuously updated from the cloud orchestration system and agents, these categorizations of entities and connections may be dynamically adapted to the recent state of the monitored system.

At S220, the system receives entities' network activities observations. These include for example, counters of outgoing and incoming traffic bytes, packets and connections, the number of unique endpoints that the entity interacted with over a time period, and the protocols and ports used in the entity's traffic.

At S225, a profile is created for each monitored entity (virtual workload), if the entity does not already have associated profiles in the detection component (S220). If the entity is identified as a member of entities-groups, or its connections are identified as members of connections-groups, profiles are also created for those groups if necessary.

In some embodiments, the profile of an entity may include one or more probabilistic distributions over the values of a large set of factors. Each factor may represent an aspect of the behavior of the virtual entity. Some of these factors are directly observable and can be measured. For example, the number of bytes sent over an outgoing connection of the entity during a specific time period. Other factors are not observable, and represent an assumed aspect of the internal state of the entity that affects the observed behavior. The values of the unobservable factors may be learned from their probabilistic dependencies (like conditional probability) on observable factors. The aggregated learned distribution of values of all the factors represents a modeled baseline of the entity's observed behavior or internal state.

In some embodiments, the profile of a monitored entity may describe conditional relationships between the factors that represent its assumed state. The probabilistic distribution of values of a factor may depend on one or more other factors through mathematical relationships. Some factors directly represent observed features of the monitored entity, so they may not depend on any other factors. The entire set of factors with the relationships between them may be formed into a data structure such as a linked list, binary tree, or directed acyclic graph.

Entities-groups profiles like those created in S225, represent, for example, an aggregated profile for a group of virtual entities that are all part of a protected object. When the protected object has multiple deployed instances of the virtual entities, it is assumed that such instances have similar underlying runtime behavior, even though they will not behave identically due to external influences like work distribution, resource allocations and timing differences.

At S230, the new observations of the actual network-related behavior of monitored entities are used to periodically update the profile of the monitored entity. Thus, the profile is automatically adapted to the dynamic changes in the entities' network behaviors. The values distribution of each observed factor is updated by merging into it its newly measured values with the measurement's uncertainty. The update of a specific factor's values distribution takes into account the factor's previous values distribution, the similarity or dissimilarity of the new values to the old values, the uncertainty about these new values, and the likelihood that the new value affects the existing values.

The updated values distributions are then recursively propagated according to the model's probabilistic dependencies between factors and the modeled mathematical relationships between their values. This propagation of new observed values ends when the effect of the new observations is accounted for by all the model's factors.

At S235, the updated profiles are checked to see if they include significant deviations from the previous profile. For example, values or changes in values exceeding thresholds of normal entity behavior or new values that are extremely unlikely according to their previous probability distribution are considered anomalous. The significance of the deviations takes into account both the difference between the expected and actual numeric values of a factor, and the uncertainty in the expected values and the uncertainty in the measurement of the actual observation.

At S240, a check is made to determine if the combination of detected anomalies may all be attributed to one or more incidents. In some embodiments this attribution is based on familiarity with known attacks which are expected to manifest in a set of anomalies. For example, a specific malicious behavior may be identified, such as a network scanner. If so, execution continues with S250 where a report is generated providing an information on the detected anomalies and the type of detected incidents. S250 may also include initiation of a mitigation action. Otherwise, in S245, the detected anomalies are reported.

Execution then returns to S205 to receive and process the next measurements of entities network activities and entities configurations changes.

Figure 3:
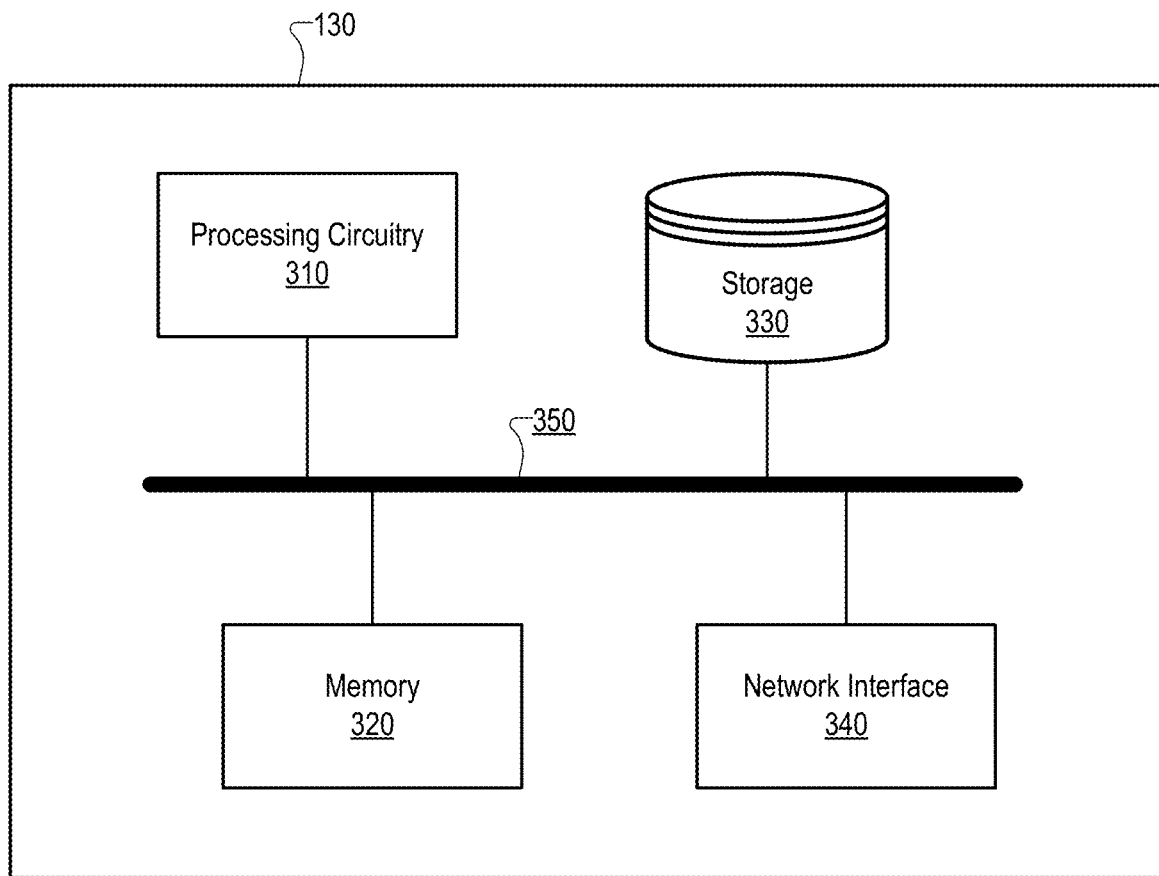
FIG. 3 is an exemplary schematic diagram of a security system according to some embodiments.

FIG. 3 illustrates an exemplary schematic diagram of a security system 130 according to some embodiments. The security system 130 includes a processing circuitry 310 coupled to a memory 320, a storage 330, and a network interface 340. In an embodiment, the components of the security system 130 may be communicatively connected via a bus 350.

The processing circuitry 310 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 320 may be volatile (e.g., RAM, etc.), non-volatile (e.g., ROM, flash memory, etc.), or a combination thereof. In one configuration, computer readable instructions to implement one or more embodiments disclosed herein may be stored in the storage 330.

In another embodiment, the memory 320 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 310, cause the processing circuitry 310 to perform the various processes described herein. Specifically, the instructions, when executed, cause the processing circuitry 310 to generate fleet behavior models and detect anomalous behavior in fleets or sub-fleets as described herein.

The storage 330 may be magnetic storage, optical storage, and the like, and may be realized, for example, as flash memory or other memory technology, CD-ROM, Digital Versatile Disks (DVDs), or any other medium which can be used to store the desired information. The network interface 340 allows the security system 130 to communicate with the node 120 for the purpose of, for example, receiving data, sending data, and the like.

It should be understood that the embodiments described herein are not limited to the specific architecture illustrated in FIG. 3, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

FIG. 4 is a block diagram illustrating example computing resources that implement a security platform, in accordance with some embodiments.

As disclosed, a security platform may implement unsupervised detection of security incidents in a cloud compute environment. A security incident may be a cyberattack, security breach, or any attempted or ongoing unauthorized access to a restricted software or hardware resource. For example, the security platform may automatically detect and identify operational activity that may be part of a cyberattack. A specific detection by the security platform of uncharacteristic behavior using a probabilistic graphical model, such as a Bayesian network, may be a basis for identifying a cyberattack that is in progress.

A specific detection may also, or instead, be a basis for identifying a methodology of a cyberattack, such as one or more of: targeted resources, compromised credentials still in use, abuse of misconfigured permissions, exploited vulnerabilities in a cloud compute environment control interface, or progression of escalation of a cyberattack.

A cloud compute environment may be a complex, dynamic system that implements various services that associate executable workloads with compute resources. The workloads may execute on the compute resources, where compute resources may include physical machines, virtual machines, memory, network hardware, among other types of computing hardware. Workloads and/or compute resources may be created, moved, modified, removed, or configured within the cloud compute environment.

In some implementations, a set of workloads and a set of compute resources within a cloud compute environment may change over time due to changes in operational activity. Operational activity may include one or more of: elastic demand for workloads, addition or removal of compute resources or capabilities, or failures and recovery from failures. The security platform may track some or all operational activity and generate audit logs that are indicative of the operational activity that has been tracked.

Within a cloud compute environment, a cyberattack may use a same or similar set of actions, commands, and/or interfaces that are used during normal, authorized, operation. A cyberattack may attempt to compromise, disrupt, or control some or all workloads or compute resources.

In some implementations, the security platform may perform one or more threat detection operations. The threat detection operations may include one or more of: focusing on unknown threats, such as cyberattacks with no published indicators or exploits of zero day vulnerabilities; detecting anomalous behavior within a specific context, such as multi-step attacks, where the cyberattack may occasionally switch contexts through pivoting or escalation to different targets or usage of different credentials; detecting usage of common operations in irregular combinations or patterns, where a cyberattack may originate from within an organization; adapting automatically without external configuration, such as an external update, reconfiguration, detection downtime, where automatic adaptations may be performed in response to changes in the cloud compute environment or in response to additional threats.

In some implementations, the security platform may detect cyberattacks without configuration information of a particular cyberattack, without detection rules or tuning of detection parameters, either at system setup or during continuous operation.

In some implementations, the technical advantages may include allocation of human resources from cyberattack detection to other priorities, focus attention on higher priority compute resources or workloads, or quicker responses to a cyberattack. Based on improved detection times, the security platform may more quickly implement remediation responses that may include updated security policies that prevent cyberattacks similar to detected cyberattacks. Quicker remediation responses may reduce or eliminate any negative consequences that may result from a successful cyberattack.

In some implementations, the threat detection operations performed by the security platform may be carried out by one or more of: analysis of audit logs of normal cloud compute operations; detection of deviations from a normal profile of operations as a probable security anomaly or incident, where a deviation may be relative to a given combination of profile baselines; automated improvement to detections of deviations, such as online adaptation of the detection model to the cloud compute environment based on automatic identification of false detections; generating alerts indicating security anomalies or security incidents, such as providing an alert to a user interface, a security log, or to an aggregation and security analysis system (e.g., Security Information and Event Management System); or automatic remediation in response to detected security anomalies or security incidents, where a remediation operation may include blocking operations associated with the detected behavior.

In some implementations, analysis by the security platform of audit logs to determine whether an operation is a deviation of a normal profile may include automated, unsupervised, real-time, multi-baseline profiling, and where multi-baseline profiling may include tracking and identifying characteristic behavior of cloud compute environment components and environmental parameters. Example cloud compute environment components may include one or more of: principals, workloads, services, environmental parameters, or compute resource parameters.

In some implementations, detection by the security platform of a deviation from a normal profile operation may be carried out by using a model of probabilistic dependencies determined between features and hidden probabilistic variables. In some examples, features may be determined based on an audit log, where some or all of the hidden probabilistic variables may represent occurrence of specific anomalous behaviors in the cloud compute environment.

In some implementations, a false detection may be based on a same unusual behavior periodically. In other examples, false detection may be based on over-sensitivity to specific deviations from a normal profile. In response to determining a false detection, the security platform may modify a probabilistic dependency in the detection model to generate a detection model that is less likely to detect a behavior associated with a false detection as a normal profile deviation.

FIG. 4 depicts an example computing environment 400 that illustrates various components of a security platform using unsupervised detection of security incidents in a cloud environment, in accordance with some embodiments.

In this example, the security platform may use audit log data to determine one or more security incidents. Audit logs may be generated using various industry standard tools. However, audit log data alone may not be indicative of a security incident. As described in greater detail below, the security platform may use audit log data to detect a security incident.

In some implementations, audit log data may comprise an overwhelming amount of data, where most of the data is from ordinary, authorized user activity. Capture of the audit log data may continuously generate large quantities of data that may be difficult to process in real-time, and the capture and storage of audit log data may be expensive in terms of compute resources and financial costs. Security threats determined after the passage of a time interval may be of limited use due to damage already having been incurred.

In some implementations, the security platform 416 may determine various types of threat scenarios. A first threat scenario may include an actor stealing credentials of a specific user or service account outside of a cloud compute environment. For example, an actor may use social engineering to lead a user to provide credentials to a cloud compute environment account or service.

In this implementation, a second threat scenario may include an actor using tokens stolen inside the cloud compute environment from a compromised or legitimately accessible resource to operate under a different user account or a different service. For example, the actor may perform a privilege escalation attack to operate under a user account with greater access privileges.

In this implementation, a third threat scenario may include an actor using an insufficiently configured, or misconfigured, policy, firewall, RBAC (role-based access control) to gain access under a security context with access to sensitive or restricted resources. In this third threat scenarios, the actor may perform a privilege escalation attack to operate under a user account with greater access privileges.

In this implementation, in a fourth threat scenario, an actor may exploit a vulnerability in a cloud compute environment API to gain access to privileged and/or sensitive resources. For example, a cloud compute environment API may provide authentication, authorization, admission control or validation of requests, or internal exposure of infrastructure APIs or credentials.

As depicted, there is a first cloud compute environment 402-1 and a second cloud compute environment 402-2. In this example, the cloud compute environment 402-1 that implements one or more services 404-1-404-L is implemented independently of the second cloud compute environment 402-2 that implements the security platform 416. However, in other examples, the services 404-1-404-L and the security platform 416 may be implemented within a same cloud compute environment, or among more than two cloud compute environments.

In this example, services 404-1-404-L may be any type of service, such as a microservice, a web application, a web server, a streaming service, among other services. Each service 404 may generate event data 406 that is indicative of a communication, a configuration change, a service error state, a timestamp associated with an event, a service or device associated with an event, an IP address associated with an event, a source associated with an application, device, system, or object (e.g., country, host name, IP address, device ID, etc.).

Audit services 408-1-408-M may be multiple instances of a single audit service, or different audit services. Audit services may include services provide by applications such as AWS CloudTrail™, Azure Activity™, Google Cloud Platform Audit™, among others. Audit log data 410 generated by the one or more audit services 408 may be provided to an audit log collector module 412.

The audit log collector module 412 may store the audit log data 410 within a data store 414. The data store 414 may be implemented within the cloud compute environment 402-1, as depicted, or the data store 414 may be implemented within a different cloud compute environment. The audit log collector 412 may provide the audit log data 410 to the security platform 416.

The security platform 416 may determine security threats that are unknown in the sense that an access attempt uses techniques that are not recognized by the security platform 416. As described below, one technique for determining security threats may be based on entity profiling, multi baseline profiling and detection. In some implementations, profiling and detection may be based on a Bayesian belief network with feedback.

The security platform 416 may comprise a plurality of modules. In this example, the security platform 416 may comprise a features extractor module 418, an anomalies detector module 422, a policy rules matcher module 424, an activity sampler module 426, an audit reporter module 428, a user interface module 430, and an outbound integrations module 432.

In this example, the security platform 416 may comprise a plurality of security services 434-1-434-N. In other examples, one or more of security services 434-1-434-N may be implemented independently of the security platform 416 or implemented on a cloud compute environment different than the second cloud compute environment 402-2.

In some implementations, the security platform 416 may periodically, or aperiodically, perform an audit log analysis to determine a security incident. Periodicity of an audit log analysis may be frequent enough to be considered performed in real-time or near real-time, such as within milliseconds, and less than single digit seconds. The security platform 416 may also, or instead, initiate an audit log analysis in response to a request.

In some implementations, the security platform 416 may use a policy used to analyze audit logs, where the policy may be specified or configured by a user. For example, the policy may specify one or more rules that indicate an action in response to matching one or more portions of an audit log. As another example, the policy may specify one or more conditions present within an audit log that may be indicative of a particular violation or security threat. As another example, the security platform 416 map a rule to a response, such as providing an alert in response to one or more rules that match one or more portions of an audit log.

In some implementations, the security platform 416 may use one or more machine learning models to determine whether audit log data is indicative of anomalous behavior. The security platform 416, in response to using the machine learning models to determine anomalous behavior, may determine a cyberattack. In some examples, the machine learning models may be trained using profile data associated with authorized user activity or authorized process activity. Process activity may be one or more operations or changes due to execution of a service, module, container, daemon, or other software process executing within a cloud compute environment.

In some implementations, a user, or service account, may comprise a principal. A principal may use or access resources within the cloud compute environment. The security platform 416 may implement outbound integrations, such as policy and detection determinations, with other services. For example, other services may include DatAdog™, ElasticSearch™, Splunk™, NewRelic™, Coralogix™, Syslog™, AWS SecurityHub™, Snowflake™, Azure Sentinel™, Google SecCenter™, Kafka™, among other services. The security platform 416 may implement inbound integrations, such as audit logs, with several services, such as AWS CloudTrail™, Azure Activity Log™, GCP Audit Log™, AWS EKS™, Azure AKS™, OpenShift™, among others.

In some implementations, the security platform 416 may provide a web user interface (UI). Based on the web UI, the security platform 416 may provide standalone deployment, PoC (proof of concept exploit), and various types of testing. In some examples, the security platform 416 may implement detection enforcement using Kubernetes (K8) admission control, data enrichment, and internal monitoring. Internal monitoring may be carried out using Prometheus™, among other services. Data enrichment may be carried out using Geo IP™, TOR Exit Node Ips™, among other data enrichment services.

In some implementations, the security platform 416 may process audit log data as an in-memory stream. Based on processing audit log data as an in-memory stream, the security platform 416 may use fewer resources, such as memory, and the security platform 416 may scale up analysis of audit log data. In some implementations, the security platform 416 may use a key-value database as a persistent buffer for incoming audit log data and for storing report data or event data.

In some examples, the security platform may be part of a different security system, where the security system uses the security platform 416 to process audit log data as part of a set of security services. In some examples, the security platform 416 may be a standalone service deployed within a cloud compute environment to process audit log data and determine cyberattacks. For example, the security platform 416 may be deployed as a K8 pod, either as a cloud service or on-site within a local compute environment.

In some implementations, the security platform 416 may adapt to a customer cloud compute environment. For example, the security platform 416 may train models using an initial set of thresholds specifying normal operations within the cloud compute environment. As audit log data indicating activity within the cloud compute environment is collected, the security platform 416 update one or more models to continuously recognize normal operations as normal, and not as a security incident. For example, workload deployments, scaling, and application behavior may change thresholds associated with normal activity. Similarly, resource changes, such as resource changes, additions, or removals, may be used to determine updated thresholds associated with normal activity.

In some implementations, the security platform 416 may perform profiling on an entity level basis. For example, the security platform 416 may associate an activity profile with a specific object, where the object may initiate an action or be a target of an action. An object may be a principal, a service, or an account. As described above, an entity profile may be updated in response to one or more changes associated with operation of the entity. In this example, significant deviations, based on a model prediction, may be determined to be security incidents instead of a basis for updating an entity profile.

In some implementations, the security platform 416 may perform multi baseline profiling and detection. For example, the security platform 416 may use historical profiles for a given entity to determine either an updated profile or detection of a security incident. Historical profiles may be associated with respective entity profiles are a plurality of previous points in time. One or more factors may be associated with a given profile, where a distribution of factor values may be used to determine one or more changes indicative of a security incident.

In some implementations, the security profile 416 may compare a first entity profile to a second entity profile to determine a security incident, where the first entity may be a peer to the second entity, a peer entity may be an entity with one or more factor values that are within one or more respective thresholds. In this way, similar to a comparison of a current entity profile to a previous entity profile, a distribution of factor values of the first entity profile and the second entity profile may be used to determine whether the differences are outside one or more thresholds. If the differences in entity profile factors is outside of one or more thresholds, then, based on the differences, the security platform 416 may determine a security incident.

In some implementations, the security platform 416 may determine an anomaly based on a deviation, beyond a specified threshold, of a first factor at a first time for a first entity from the first factor at a second time for the first entity. In some examples, the deviation may be determined to be anomalous without being determined to be indicative of a security incident.

In some examples, a number of anomalies greater than an anomaly threshold may be a basis for the security platform 416 to determine a security incident. in some examples, an incident, or security incident, may be a correlated co-occurrence of a plurality of different anomalies associated with a same entity, where the anomalies are associated with a security context, such as audit log data associated with login attempts, geography, a restricted resource, and so on.

In some implementations, the security platform 416 may provide security incident data in response to determining a security incident, such as a cyberattack. For example, security incident data may comprise one or more of the following: a time associated with the security incident; entity identification, such as the entity type, an entity unique identifier, an entity account data, among other data descriptive of the entity or operation of the entity; a detection type, such as a security incident, an anomaly that is nota security incident, or some other detection type; a detection identifier associated with an entity; a textual description of the security incident; a probability associated with likelihood that the detected security incident, where the probability may be correlated to a high-level alert, medium-level alert, or low-level alert; one or more bases for detection of a security incident, such as features, factor values, likelihood of relevant dependencies factors; or values of observable factors associated with anomaly dependencies.

In some implementations, the security platform 416 may suppress detections of anomalies that are sensitive or noisy. For example, a detection may be noisy based on one or more of: a high count (e.g., over a first threshold), of all detections per time period for a given entity; a high count (e.g., over a second threshold), of a particular detection per time period for a given entity; a periodicity of specific detection associated with an entity; or a high count (e.g., over a third threshold), of a specific detection per time period for any entity.

In some implementations, the security platform 416 may use noisy entity data as correction feedback for an entity profile state to reduce the noisiness of subsequent detections. For example, the security platform 416 may apply a probability reducing observation to respective active detection factors, which may trigger updates backward along dependencies to active factors. Such a correction may be with respect to a probabilistic graphical model, where a dependency may be a graph edge.

In some implementations, the security platform 416 may use a probabilistic graphical model, such as a Bayesian Belief Network, where the Bayesian Belief Network may use feedback. For simplicity, a probabilistic graphical model, or Bayesian Belief Network may be referred to as a probabilistic model. For example, the security platform 416 may extract periodic features from a data stream comprising audit log data, where the extracted features may be matched to one or more entities.

Continuing this implementation, the security platform 416 may determine an entity's current state within a probabilistic model, where a new entity state may be created if a state within the probabilistic model does not exist that matches the entity current state. The security platform 416 may apply features as observations to observable factors. For example, the security platform 416 may associated values to associated observable factors or drop old values. The security platform 416 may propagate a distribution of updated factor values within a probabilistic model.

For example, propagation may comprise the security platform 415 updating a factor to be active. The security platform 416 may determine active detection factors. For example, the security platform 416 may determine that detection data may include reasons for a security incident based on a relevant factor's dependencies within the probabilistic model.

In some implementations, the security platform 416 may update and verify feedback from detection of a security incident. For example, with respect to suppressed detections described above, the security platform 416 may drop the detection, apply a rank change to the detection factors, and propagate backward within the probabilistic model. In this example, for unsuppressed security incidents, the security platform 416 may generate an alert to describe the security incident.

In some implementations, the security platform 416 may detect behavior anomalies using a probabilistic model and using policy-based detection. In other implementations, the security platform 416 may only use a probabilistic model.

Advantages of using anomaly detection include detection of unknown threats, where an unknown threat may be a threat without published signatures or IoCs (indicators of compromise) or exploits of a zero-day vulnerability. Another advantage is that anomaly detection may create detections that use context, such as multistep cyberattacks that may use context switching through pivoting or escalation. Another use of context to determine a cyberattack may be instances where an attacker uses common operations in irregular combinations. Such use of anomaly detection may be especially useful for insider threats.

In some implementations, the security platform 416 may use behavior anomaly detection to determine a policy misconfiguration or a mismatch between a policy and a change to a computing environment. An advantage of behavior anomaly detection may be that the security platform 416 may determine cyberattacks without use of signatures, and without use of signature updates when new vulnerabilities are published. As described above, the security platform 416 may automatically adapt to changes in a monitored computing environment. In some examples, such adaptations may be performed without initial configurations.

In some implementations, the security platform 416 may use carry out behavior anomaly detection using continuous unsupervised learning from a customer's computing environment at runtime. In some examples, it may be difficult to anticipate regular activity without continuous training. In some examples, the security platform 416 may implement behavior anomaly detection based on use of security knowledge, such as possible and likely cyberattacks and cyberattack indicators.

In some implementations, the security platform 416 may use continuous unsupervised learning to increase a ratio of true positive detections of cyberattacks to false positive detections. The security platform 416 may use context data to provide detailed explanations of a detected cyberattack in an incident report, alert, or log. In some cases, the security platform 416 may detect behavior anomalies in near real-time, such as a few minutes from occurrence to detection.

In some implementations, the security platform 416 may adapt to a computing environment without pre-training, where initial detection thresholds may be adjusted for TP/FP (true positive/false positive) balance. In other examples, the security platform 416 may suppress detections of cyberattacks during an initial training period, such as a few minutes.

In some examples, the security platform 416 may adapt behavior anomaly detection to one or more of: changes in workload deployments; scaling; application behaviors; changes to principal resources, such as creation, deletion; or changes to principal behaviors. In some examples, the security platform 416 may adapt behavior anomaly detection based on automatic threshold changes to account for noise, as described above, and/or based on user input.

In some implementations, the security platform 416 may use multiple probabilistic models. For example, a first probabilistic model may be based on domain-agnostic audit log data, such as network activity. A second probabilistic model may be based on domain-specific audit log data, such as application behavior, workload data, and other domain-specific audit log data. In some examples, the security platform 416 may use in-memory state and processing of audit log data, which may be a basis for scaling and parallelizing behavior anomaly detection.

In some implementations, the security platform 416 may use audit log data indicative of a particular domain. For example, network traffic within a Kubernetes cluster, such as network traffic between workloads and/or nodes, cluster-inbound network traffic, and cluster-outbound network traffic. The audit log data may indicate network protocols associated with network traffic, such as TCP/UDP/DNS/IP, and so on. The audit log data may also indicate IP enrichment, such as Geo, ASN, and the like.

Continuing this example, features usable within a probabilistic model may include one or more of: source/target workloads—count or unique-count; source/target IPs—count, unique-count; ports, protocols in network traffic—unique count; incoming/outgoing byte counts; DNS request type, such as A, AAAA, TXT, and so on; or low-level contextless network protocol irregularities. Given a probabilistic model based on a network traffic domain, the security platform 416 may detect port scanning, endpoint scanning, and/or DNS tunneling.

In some implementations, the network platform 416 may use a domain may be audit log analysis of control plane operations in Kubernetes. In this example, features usable within a probabilistic model may include one or more of: identifier of a principal performing a control plane operation; a resource on which a control plane operation is performed; an IP address from which a control plane operation originated; an HTTP user-agent tool from which an API call originated; or an unauthorized control plane operation associated with a principal on a resource. Given a probabilistic model based on this domain example, the security platform 416 may detect anomalous resource access, anomalous control plane operations, anomalous IP addresses, anomalous HTTP user-agent tools, or resources accessed by anomalous principals.

In some implementations, the network platform 416 may use a domain may be audit log analysis of threat scenarios. In this example, a threat scenario may be where a cyberattack includes stealing credentials of specific users or specific service accounts outside of a cluster in K8. Another threat scenarios may be where a cyberattack uses tokens stolen inside a cluster from a compromised or legitimately accessible resource to operate under a different user or service account. Such a cyberattack is described above as lateral movement or privilege escalation. Another threat scenario may be where a cyberattack identifies insufficient or misconfigured RBAC to gain access under their own security context to privileged and sensitive resources. Another threat scenario may be where a cyberattack includes using vulnerabilities in Kubernetes API server (e.g., authentication, authorization, admission control, or validation of requests) to gain access to privileged or sensitive resources.

In some implementations, an entity may be a domain-specific object that may be associated with a behavior. For example, a domain-specific object may be an activity profile. An activity profile may be indicative of initiation of an action or indicate a target of an action. A given entity profile may be continuously, or periodically, learned and updated. In this way, the security platform 416 may determine significant deviations from a given profile to detect a cyberattack.

In some implementations, an entity may be associated with a particular domain. In a first examples, a domain may be, as discussed above, Kubernetes network traffic, where an entity may be a pod or a node. In this example, network activity may be used as features for a probabilistic model.

In a second example, a domain may be audit log data associated with a Kubernetes audit log, where an entity may be a resource, a cluster, or a principal. A principal may be a user, a service account, a group of users, or group of service accounts. In this example, associated entries within the Kubernetes audit log may be used as features for a probabilistic model.

In a third example, a domain may be AWS CloudTrail audit log, where an entity may be a principal, service, or account. In this example, a principal may be a user, role, or account. Further, in this example, associated entries within the AWS CloudTrail audit log may be used as features for a probabilistic model.

In some implementations, an entity may be associated with a specific instance in a profile model. In this example, an entity may be a variation of a configured profile model based on an entity type, such as a model for a principal, or such as a model for a resource. In some examples, an entity profile state may be updated periodically based on computing environment observations.

An entity state may be associated with one or more of the following: thresholds for detections of cyberattacks, where thresholds may be adapted to values within a most recent time period; feedback state data, such as suppressions and/or unsupervised improvement of an entity profile instance; or samples of a most recent time period's observed data values.

As described in this disclosure, for clarity, some steps are attributed to certain modules, in other examples, the steps, a subset of steps, or similar steps, may be performed in different orders or by different modules, or entirely by the security platform 416 without a modular delineation.

Figure 5:
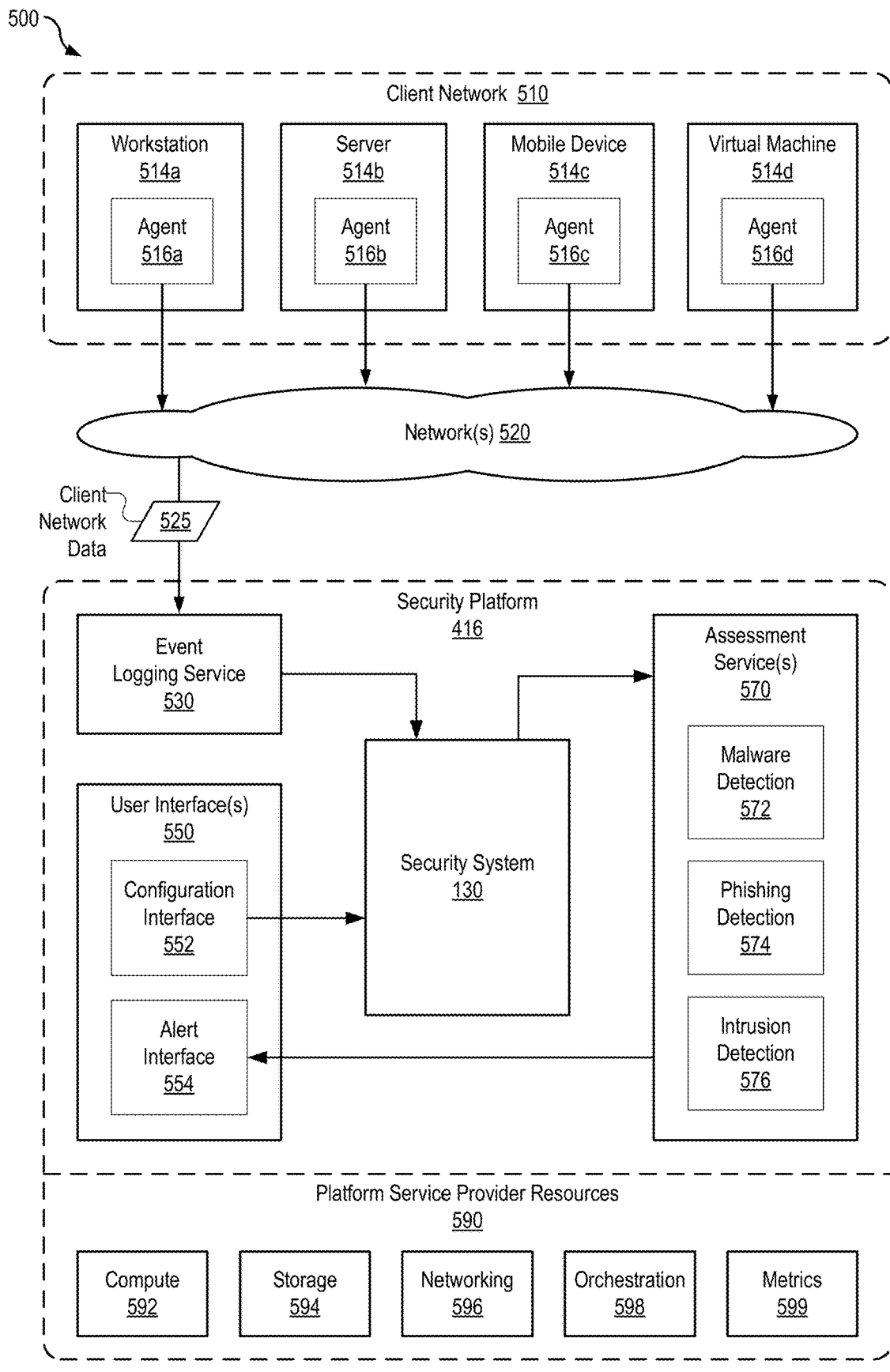
FIG. 5 is a block diagram illustrating example computing resources that implement a security platform, in accordance with some embodiments.

FIG. 5 is a block diagram illustrating example computing resources that implement a security platform, in accordance with some embodiments.

The security platform 416 may comprise one or more services implemented within a cloud computing environment and/or on a platform service provider network, such as a platform-as-a-service (PaaS) network, an infrastructure-as-a-service provider (IaaS) network, or a software-as-a-service (SaaS) network. The security platform 416 may be configured to communicate with agents 516a—d deployed on computing resources in a client network 510.

In this example, the client network described with respect to FIG. 1 may be implemented by the client network 510, and the referenced computing resources may be implemented by computing resources 514a-514d. In this example, the computing resources 514a-514d are depicted as a workstation, a server, a mobile device, and a virtual machine. In other examples, a computing resource 514 may comprise personal computers, cloud compute instances, laptops, among other types of computing resources, or some other resource that may be vulnerable to a cyberattack. Computing resources are described in greater detail below.

In this example, agents 516 may communicate with the security platform 416 over one or more intermediary networks 520. In some embodiments, the agents 516 may be configured to collect or compile network activity data or network event data, and transmit the data, depicted as client network data 525, to the security platform 416. The security platform 416 may receive network activity data from many different client networks operated by different entities, companies, organizations, groups, etc., and perform remote monitoring of the networks of these different clients.

As shown, the client network 510 in this example includes different types of computing resources, such as a workstation 514a, a server 514b, a mobile device 514c, and a virtual machine 514d. The virtual machine 514d may be an instance of a computer and operating system that is emulated and hosted on a physical virtual machine host. The virtual machine host may implement virtualization hardware and/or software (e.g., a hypervisor) to execute and manage multiple instances of guest operating systems.

Example implementations of such virtualization technologies include VMware ESX/ESXI, Microsoft Hyper-V, Amazon Web Services, and Microsoft Azure. Another type of virtualized execution environment may be a hosted container, which provides a portable and isolated execution environment over a host operating system of a physical host. Examples of container hosting technologies include Docker, Google Kubernetes, Amazon Web Services, and Microsoft Azure. In some embodiments, the virtual machine 514d may be hosted in a platform service provider network, such as the platform service provider network that is hosting the security platform 416. In some embodiments, the agents 516 may be deployed on other types of computing systems, including embedded systems, networking devices, storage devices, Internet-of-Things (IoT) devices, vehicles, and the like.

In various embodiments, the network 520 may encompass any suitable combination of networking hardware and protocols necessary to enable communications between the agents 516 and the security platform 416. In some embodiments, the remote machines 514 may execute in a private network of a company, behind a company firewall, and the network 520 may include a public network such as the Internet, which lies outside the firewall. The network 520 may encompass the different telecommunications networks and service providers that collectively implement the Internet.

In some embodiments, the network 520 may also include private networks such as private local area networks (LANs), private wide area networks (WANs), or private wireless networks. The network 520 may be implemented using different hardware (e.g., modems, routers, switches, load balancers, proxy servers, etc.) and software (e.g., protocol stacks, routing software, firewall/security software, etc.) for establishing networking links between the remote machines 514 and the security platform 416. In some embodiments, the agents 516 may transmit the client network data 525 to the security platform 416 over secure communication channels such as transport layer security (TLS) connections implemented over the network 520.

As shown in this example, the security platform 416 is implemented using a number of supporting services 530, 108, 550, and 570 implemented by the platform service provider network. Clients of the security platform 416 may convey service requests to and receive responses from these services via their respective service interfaces. In some embodiments, the service request and responses may be defined as part of a RESTful API (e.g., one or more web services). The requests and responses may be formatted as JSON documents. In some embodiments, the security platform 416 may implement service interfaces using other types of remote procedure calling protocols, such as Google Protocol Buffers. The platform service provider network may provide the hardware and/or software needed to implement service endpoints for these services, and the request routing facilities to ensure that a request is properly routed to the appropriate endpoints.

As shown, the platform service provider network may provide different types of computing resources, such as platform service provider resources 590, which can be used by customers to implement hosted services. As shown, the platform service provider may provide resource services such as compute resource service 592, storage resource service 594, networking resources service 596, orchestration service 598, and resource metrics service 599. The services of the security platform 416 may be built using these underlying resource services provided by the platform service provider.

In some embodiments, the platform service provider resources 590 may implement features such as load balancing of service requests and/or dynamic management and scaling of service node pools. In some embodiments, each of the services 530, 108, 550, and 570 may be implemented using a pool of service nodes provided by the platform service provider, which may be individual instances of virtual machines. In some embodiments, the platform service provider may be a provider such as Amazon Web Services or Microsoft Azure.

In some embodiments, the security platform 416 may be configured to monitor, analyze, and respond to security-related incidents that are detected in the remote client networks 510. For example, the client network data 525 may indicate request data 118, where the security platform 416 may determine a cyberattack as described with respect to FIG. 1.

In some embodiments, the security platform 416 may implement an event logging service 530 that receives client network data 525 from a client network 510 and stores the received data. The event logging service 530 may implement service functionality to allow users or other software components to query the event logs.

As shown, in some embodiments, the assessment service(s) 570 may implement a variety of monitoring processes to generate alerts in response to detected security problems in the client network 510. These alerts may be forwarded to an alert interface 554, which may allow human security analysts to perform a more in-depth examination of any underlying security problems. For example, in some embodiments, a malware detection module 572 may examine collected machine event logs to detect installation of a particular type of malware executable. As another example, a phishing detection module 574 may examine the email event logs to detect phishing attacks using new or unusual email addresses, web addresses, or email content. As yet another example, an intrusion detection module 576 may examine the network event logs to detect suspicious communication patterns or attacker packet signatures. In some embodiments, the alerts generated by the assessment service(s) 570 may trigger automated mitigation actions to be performed on the client network 510 to address detected threats in the client network.

In some embodiments, the security platform 416 may implement one or more user interface(s) 550, which may be implemented as GUIs or web interfaces viewable using a web browser. In some embodiments, these user interfaces 550 may be implemented by client-side applications. As shown, the user interfaces may include the alert interface 554 to notify users of detected alerts. In some embodiments, the alert interface 554 may be accessible from both the client network 510 and a central monitoring location where security analysts are monitoring the client network.

In some embodiments, the user interface(s) 550 may also implement a configuration interface 552. The configuration interface 552 may be used to configure various aspects of the security platform 416, including the security service 104. For example, the configuration interface 552 may be used to control various aspects of how the security service 104 operates, including initiating a scan, indicating one or more computing resources, and/or specifying a scanning schedule.

In some implementations, the security platform 416 may be implemented within a container system of a cloud computing environment or a container system of a data center. For example, a container system may be implemented by one or more container orchestration systems, including Kubernetes™, Docker Swarm™, among others. The container orchestration system may run on a cluster of nodes. In some examples, a given node may comprise a container runtime, where the given node may be implemented by one or more compute instances provided by a cloud services provider. In some examples, a given node among the cluster of nodes may comprise a container runtime, compute resources, memory, and one or more container instances.

In some implementations, the security platform 416 may comprise multiple services. For example, the security platform 416 may comprise services implemented by containerized applications operating on one or more nodes of a cluster. In this example, the security platform 416 may be implemented by a one or more containerized applications.

Figure 6:
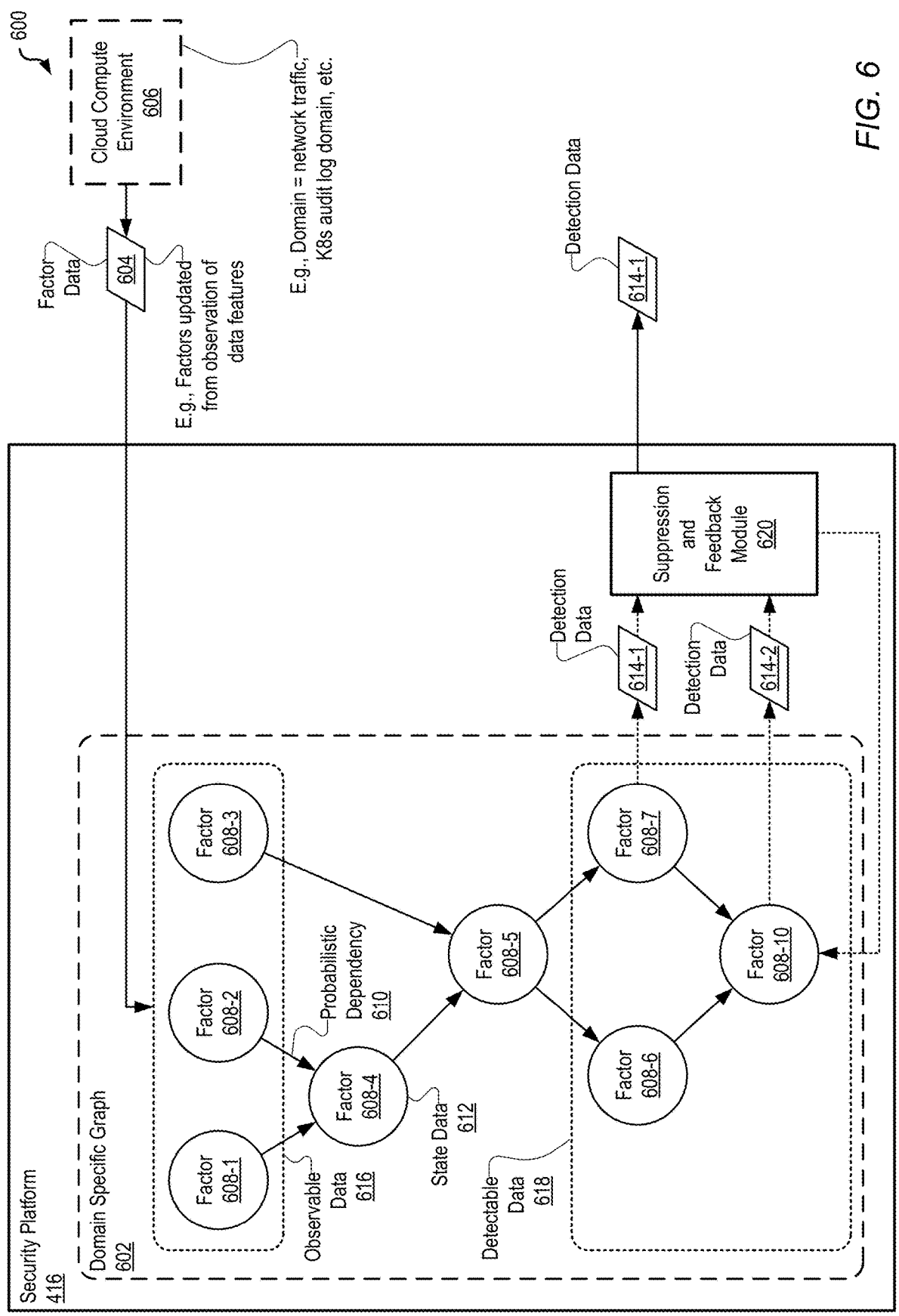
FIG. 6 is a block diagram illustrating various components of a security platform, in accordance with some embodiments.

FIG. 6 is a block diagram illustrating a security platform, in accordance with some embodiments.

In this example, the security platform 416 implements a domain specific graph 602 that uses inputs comprising factor data 604. Factor data 604 may indicate factors from observation of data features, where factors and data features are described above. In this example, the factor data 604 is associated with a specific domain, network traffic from a cloud compute environment 606. As described above, factor data 604 may be based on audit log data.

In some implementations, a probabilistic graph, such as domain specific graph 602 may comprise nodes, where a node is representative of probabilistic factors. Probabilistic factors are depicted as factors 608-1-608-10. A factor 608 may represent a partial domain state, where a factor 608 may indicate a distribution over values that are a likelihood of correctness. State data is depicted as state data 612. In this example, a graph edge may represent a probabilistic dependency between factors 608, such as probabilistic dependency 610 between factor 608-2 and factor 608-4. Output, or a determination of a behavioral anomaly associated with a cyberattack, is depicted as detection data 614-1 and 614-2.

In some implementations, a design of a probabilistic model may be carried out using different techniques. For example, a probabilistic model may be a graph comprising a Bayesian Belief Network. In this example, a graph node may comprise a probabilistic factor. A factor may represent a partial domain state with a given level of uncertainty. A factor may represent a state using a probabilistic distribution over values indicating a likelihood of correctness. In some examples, each value may be numeric or Boolean.

In some implementations, a graph edge may represent a probabilistic dependency between factors. In this example, forward or backward propagation of a values' distribution may be along and according to a dependency between a node and a Bayes rule. In some examples, updating a factor's state according to a Bayes rule means that a current values' distribution has a "memory" of previous distributions or states. An uncertainty value of a state (e.g., "fuzziness"), may represent one or more potential state update sequences.

In some implementations, observable factors within a Bayesian Belief Network may be inputs. An input may be a factor that is updated based on determination of a change in a feature. In some examples, an update to a factor's value distribution may result a recursive update of dependent factors. In this example, observable data, indicating observable factors, is depicted as observable data 616.

In some implementations, a detectable factor within a Bayesian Belief Network may be an output. A factor with a likelihood of being logically "true" or having a value above a certainty threshold may be representative of a behavioral anomaly associated with a cyberattack. For example, a dependency of a factor may be compared by the security platform 416 to a numeric values distribution of another numeric factor to an activation threshold to determine a likelihood of the factor being "true" or having a value above a certainty threshold. In this example, detectable data, indicating detectable factors, is depicted as detectable data 618.

In some examples, a factor's dependency may apply Boolean operators (e.g., AND, OR, NOT, XOR) on one or more Boolean factors, where a given factor may be associated with a "true" likelihood, to combine the Boolean factors. In this example, the security platform 416 may, based on the combined Boolean factors, determine whether the factor is determined to be "true", or indicative of a behavioral anomaly associated with a cyberattack. In some examples, detection feedback may be applied to a detection factor as an observation (e.g., "make less likely", "make more likely", etc.), where as a result, the security platform 416 may perform a recursive update of "backward" dependent factors.

In some implementations, in a domain associated with network traffic, audit log data may have features such as a number of DNS packets of type TXT within the past 5 minutes. In this example, observations may result in encoding features as value distributions indicative of measurement uncertainty. In this example, a first factor may be "number of DNS packets of type TXT in the past 5 minutes", where a state may indicate a distribution over numeric values, and an observation may be periodic state update.

A second factor may be "change in number of DNS packets of type TXT in the past 5 minutes", where a state may indicate a distribution over integer values, and where the second factor may have a dependency on the first factor. Based on the dependency of the second factor on the first factor, a change of state of the first factor results in an update to the second factor.

A third factor may be "anomaly in DNS packets of type TXT in the past 5 minutes", where a state may indicate a likelihood of "true" and a numeric threshold, where the third factor may have a dependency on the second factor. Based on the dependency of the third factor on the second factor, a likelihood of a "true" for the third factor may change in response to a change to the second factor. In this example, the likelihood of "true" may be calculated by comparing values' distribution of the second factor with a specified threshold.

In some implementations, the security platform 416 may perform various updates to the Bayesian Belief Network in profiling and detecting cyberattacks. For example, the security platform 416 may extract periodic features from audit log data to match features to an entity or entities.

In some implementations, the security platform 416 may determine each entity's current state within the Bayesian Belief Network. If the security platform 416 determines that the entity does not exist, the security platform 416 may create a new entity state according to the entity type and relevant model. The security platform 416 may apply features as observations to observable factors.

For example, the security platform 416 may associate values samples to associated observable factors and drop or delete older values samples. The security platform 416 may propagate updated values distributions for factors within the Bayesian Belief Network. For example, propagation may result in detection factors being active.

In some implementations, the security platform 416 may collect active detection factors. For example, detection factors may include reasons according to associated factors' dependencies and values samples. The security platform 416 may update and check detections' feedback.

In some implementations, for a suppressed detection, the security platform 416 may apply likelihood-reducing observation to a detection factor and propagate likelihood changes backward in the Bayesian Belief Network along dependencies to active factors. As depicted, detection data 614-2 may be associated with a detection of behavioral anomaly that is suppressed by suppression and feedback module 620, and based on being suppressed, is not generated as an output.

Continuing this example, detection data 614-2 is used as a basis to determine a modification to factor 608-10, such that factor 608-10 is less likely to indicate detection of a behavioral anomaly under similar conditions at a later point in time, as described above.

In contrast, detection data 614-1 is not suppressed, and is produced as an output indicating behavioral anomaly detection. In this example, the security platform 416 may, for an unsuppressed detection, determine a behavioral anomaly associated with a cyberattack and generate an alert or initiate remediation operations.

In some implementations, the security platform 416 may use the suppression and feedback module 620 to identify detections that are too noisy, or noisy above a specified threshold. In some examples, identification of noise may include one or more of the following indications of noise data: high count of all detections per period for an entity (e.g., a count greater than a first threshold); a high count of specific detections per period for an entity (e.g., a count greater than a second threshold); periodicity of specific detection on an entity; a high count of specific detection per period on an entity (e.g., a count greater than a third threshold).

In some implementations, based on whether the detection is too noisy, the security platform 416 may suppress the detection and not report the detection. Instead, the security platform 416 may use the noise data to correct feedback on an associated entity factor 608. For example, the security platform 416 may reduce an observation to respective active detection factors, which may result in updates "backward" along dependencies (graph edges) to active factors.

In some implementations, an entity variant may be an entity identified as having a specific role or functionality. An entity variant may be expected to have a similarity to a generic entity with same functionality, regardless of a specific environment. For example, a web server may be accessible from the internet, whereas database may not be generally accessible from the internet. As another example, a node within K8s usually connects to nodes, and pods to pods, but not the inverse. In a probabilistic graph, factors and dependencies may be customized to their expected behaviors.

In some implementations, an instance of an entity of another entity may be expected to behave similarly. For example, multiple Kubernetes pods within a same deployment, different users from a same user group, database shards, and so on. In addition to observable factors representing observations of a first entity, some observable factors may represent observations of each similar entity that is an instance of the first entity. Unobservable factors may represent a difference in the state of the first entity factors and factors of instances of the first entity, upon which detection factors may depend. In some examples, entities that are part of a functional super-entity may provide full functionality of the super-entity together. For example, an application providing microservices, or all pods in a Kubernetes cluster. In this example, a probabilistic graph may be associated with a configuration and instance for an aggregate entity, where observations may be provided into the aggregate entity (e.g., a sum of counters).

In some implementations, a remediation operation may include restricting access, tracking operations associated with a cyberattack, alerting an administrator, among others. A remediation operation may also depend on a confidence level of a determination of a cyberattack, where more restrictive remediation operations are performed for cyberattack determinations with higher confidence levels than for cyberattack determines with lower confidence levels. Restricting access may include blocking an actor associated with a cyberattack indicated by cyberattack detection data or blocking subsequent requests associated with a cyberattack indicated by cyberattack detection data.

In some implementations, an anomaly may represent a deviation beyond a threshold from a specific aspect of an associated current profile. However, in some examples, an anomaly is not malicious or indicative of a cyberattack. In some examples, the security platform 416 may base detection of a security incident on a correlated co-occurrence of a number of different anomalies associated with a same entity, where the number of different anomalies may be larger than an anomaly threshold. An anomaly threshold may be configurable.

In some implementations, the security platform 416 may generate report data indicative of one or more of: a time of a security incident; an entity identification, such as entity type, entity identifier, entity properties, and so on; detection type, such as an anomaly or a security incident; a detection identifier; a textual description of a detection; detection likelihood or probability; one or more bases for determining a detection of an anomaly or security incident, such as related activities or operations, likelihoods of dependencies' factors, values for observable factors, and so on.

In some implementations, the security platform 416 may use various design techniques. For example, qualitative Bayesian probability may use rank theory, where discrete likelihood levels may be associated with ranks. A rank may be a positive integer, or other relative quantitative value. In this example, Bayesian rule equivalence of probability updates may be used to apply observations on factors and to propagate values distributions from each changed factor to factors that depend on the changed factor.

In some implementations, rank updates may include a rank of a possibility with a conditional on a proposition B, denoted by K(w|B), if K(B)<∞(infinity), and B is not impossible may be determined by K(w|B)=K(w)−K(B) if w∈B, and K(w|B)=∞ if w∉B.

Continuing this example, and similar to the above description of rank updates, the security platform 416 may use additional rank updates may use rank theory principles, including the following equations:

TABLE 1

| Description | Probability Theory | Ranking Theory |
|---|---|---|
| Falsehood | $P(\phi) = 0$ | $K(\phi) = \infty$ |
| Truth | $P(\Omega) = 1$ | $K(\Omega) = 1$ |
| Complement Rule | $P(A) = P(\overline{A}) = 1$ | $\min(K(A), K(\overline{A})) = 0$ |
| Conditional-isation | $P(A|B) = \dfrac{P(A \cap B)}{P(B)}$ | $K(A|B) = K(A \cap B) - K(B)$ |
| Multiplication Rule | $P(A \cap B) = P(A) * P(B|A)$ | $K(A \cap B) = K(A) + K(B|A)$ |
| Conditional Independence | $P(A \cap B|C) = P(A|C)P(B|C)$ | $K(A \cap B|C) = K(A|C) + K(B|C)$ |
| Bayes' Theorem | $P(A|B) = \dfrac{P(B|A)P(A)}{P(B)}$ | $K(A|B) = K(B|A) + K(A) - K(B)$ |

Figure 7:
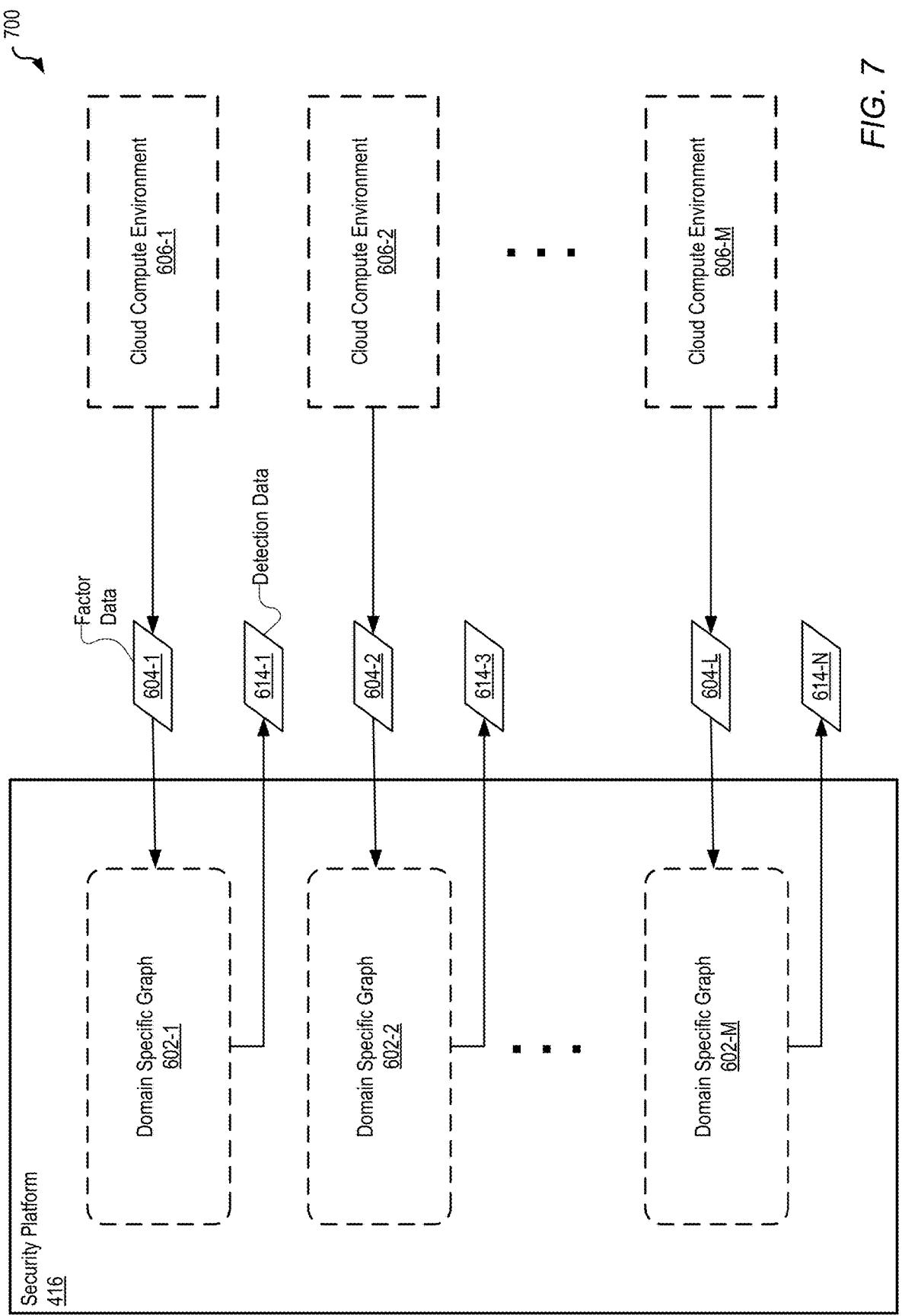
FIG. 7 is a block diagram illustrating various components of a security platform, in accordance with some embodiments.

FIG. 7 is a block diagram illustrating a security platform, in accordance with some embodiments.

In this example, the security platform 416 implements a plurality of domain specific graphs, depicted as domain specific graphs 602-1-602-M. Each domain specific graph 602 may use inputs comprising respective factor data, depicted as factor data 604-1-604-L.

In some implementations, factor data 604 may indicate factors from observation of data features, where factors and data features are described above. In this example, the factor data 604 is associated with a respective specific domain, where the specific domain may be associated with an audit log data domain associated with a respective cloud compute environment. In this example, the respective cloud compute environments are depicted as cloud compute environments 606-1-606-M. As described above, factor data 604 may be based on audit log data.

Continuing this example, for each individual domain specific graph 602, the security platform 416 may use factor data 604 to determine detection data 614. The detection data 614 is determined similarly to the description of the example determination of detection data described above with respect to FIG. 6.

Figure 8:
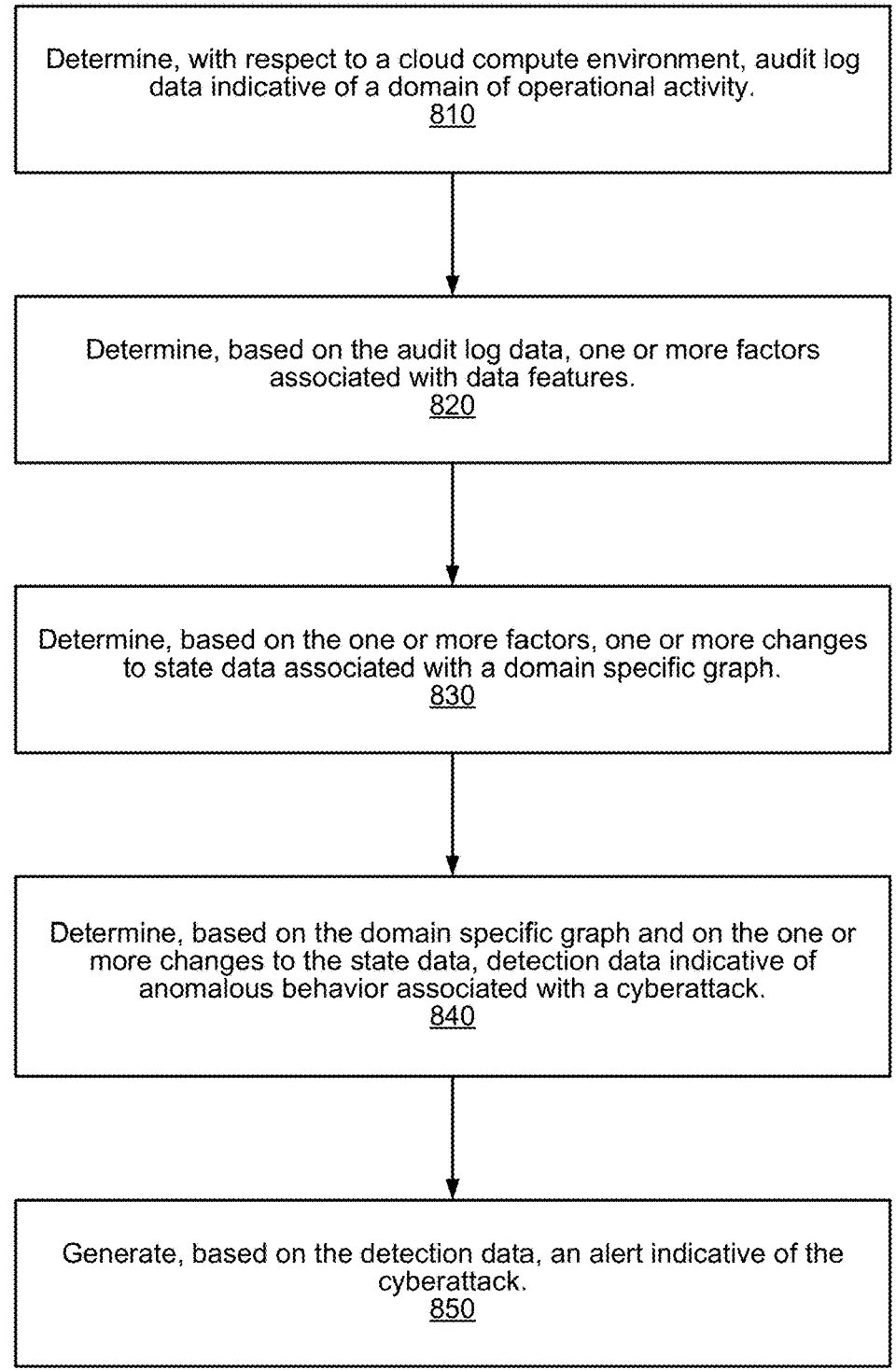
FIG. 8 is a flowchart that illustrates an example of a platform detecting security incidents in a cloud environment, according to some embodiments.

FIG. 8 is a flowchart 800 that illustrates an example of the security platform using multiple stages of classifiers to determine a cyberattack. In FIG. 8, one or more hardware processors may be used to implement the example process, where the hardware processors are described with respect to FIGS. 5 and 10.

FIG. 8 illustrates an example process carried out by the security platform 416 that includes: determining, at 810, with respect to a cloud compute environment, audit log data indicative of a domain of operational activity; determining, at 820, based on the audit log data, one or more factors associated with data features; determining, at 830, based on the one or more factors, one or more changes to state data associated with a domain specific graph; determining, at 840, based on the domain specific graph and the one or more changes to the state data, detection data indicative of anomalous behavior associated with a cyberattack; and generating, at 850, based on the detection data, an alert indicative of the cyberattack.

Determining, at 810, with respect to a cloud compute environment, audit log data indicative of a domain of operational activity may be carried out as described with respect to FIGS. 4-9. For example, determining audit log data, such as audit log data 410, may be determined as described with respect to FIG. 4.

Determining, at 820, based on the audit log data, one or more factors associated with data features may be carried out as described with respect FIGS. 4-9. For example, as described with respect to FIGS. 4-9. For example, the one or more factors 608, factor data 604, and data features are described with respect to FIGS. 4-9.

Determining, at 830, based on the one or more factors, one or more changes to state data associated with a domain specific graph may be carried out as described with respect to FIGS. 4-9. For example, automatic changes and/or updates to a domain specific graph, including state data, is described with respect to FIGS. 4-9.

Determining, at 840, based on the domain specific graph and the one or more changes to the state data, detection data indicative of anomalous behavior associated with a cyberattack may be carried out as described with respect to FIGS. 4-9. For example, detection data 614 is described with respect to domain specific graph 602.

Determining, at 850, based on the detection data, an alert indicative of the cyberattack may be carried out as described with respect to FIGS. 4-9. For example, the detection data 614-1, described in FIG. 6, may be indicative of behavioral anomalies and of a cyberattack.

FIG. 9 is a flowchart 900 that illustrates an example of the security platform using multiple stages of classifiers to determine a cyberattack. In FIG. 9, one or more hardware processors may be used to implement the example process, where the hardware processors are described with respect to FIGS. 5 and 10.

FIG. 9 illustrates an example process carried out by the security platform 416 that includes: determining, at 910, based on first audit log data, a plurality of baseline profiles associated with operational activity within a cloud compute environment, wherein the plurality of baseline profiles is associated with a probabilistic graph; determining, at 920, based on second audit log data, one or more updates to the probabilistic graph; determining, at 930, based on third audit log data and on one or more probabilistic dependencies associated with the probabilistic graph, a number of deviations of operational activity; determining, at 940, based on the number of deviations being greater than a threshold value, detection data indicative of a cyberattack; and generating, at 950, based on the detection data, an alert indicative of the cyberattack.

Determining, at 910, based on first audit log data, a plurality of baseline profiles associated with operational activity within a cloud compute environment, wherein the plurality of baseline profiles is associated with a probabilistic graph may be carried out as described with respect to FIGS. 4-9. As described with respect to FIG. 4, audit log data 410 may be collected periodically or continuously.

Determining, at 920, based on second audit log data, one or more updates to the probabilistic graph may be carried out as described with respect to FIGS. 4-9. For example, audit log data is continuously or periodically collected, which may include second audit log data, and collection of the second audit log data may result in automatic changes and/or updates to a probabilistic graph, including state data, is described with respect to FIGS. 4-9.

Determining, at 930, based on third audit log data and on one or more probabilistic dependencies associated with the probabilistic graph, a number of deviations of operational activity may be carried out as described with respect to FIGS. 4-9. For example, automatic updates to a probabilistic graph are described with respect to FIG. 6.

Determining, at 940, based on the number of deviations being greater than a threshold value, detection data indicative of a cyberattack may be carried out as described with respect to FIGS. 4-9. For example, multiple deviations are described with respect to FIG. 6, where a behavioral anomaly associated with a cyberattack may be determined based on the number of deviations being greater than a threshold value.

Generating, at 950, based on the detection data, an alert indicative of the cyberattack may be carried out as described with respect to FIGS. 4-9. For example, the detection data 614-1, described in FIG. 6, may be indicative of behavioral anomalies and of a cyberattack.

Figure 10:
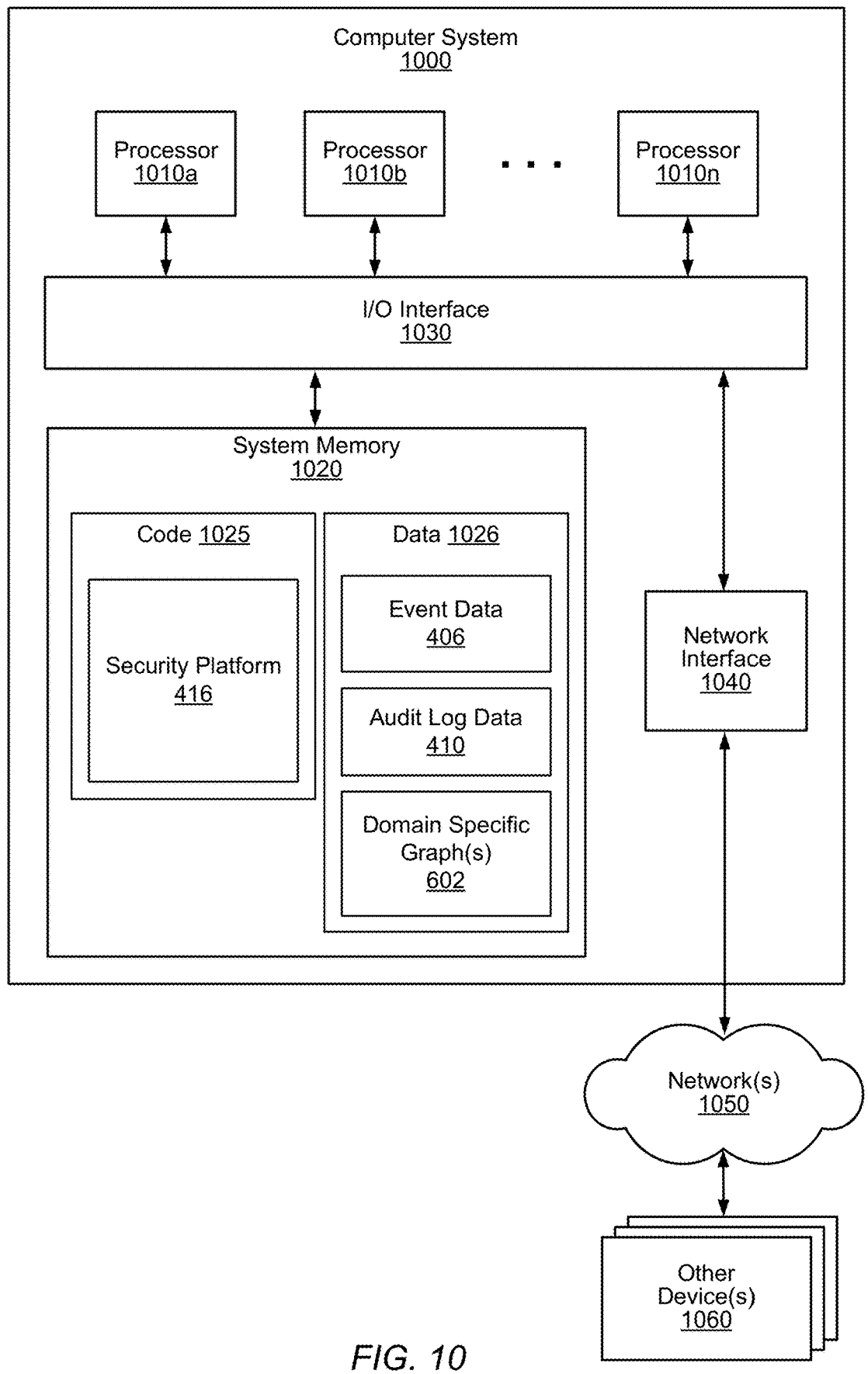
FIG. 10 is a block diagram illustrating an example computer system that may be used to implement one or more portions of a security platform, according to some embodiments.

FIG. 10 is a block diagram illustrating an example computer system 1000 that is used to implement one or more portions of a system that implements a security platform 102, according to some embodiments. For example, the computer system 1000 may be a server that implements one or more components of the security platform 102 of FIGS. 1-5.

Computer system 1000 may be implemented using a variety of computing devices, such as a personal computer system, desktop computer, laptop or notebook computer, mainframe computer system, handheld computer, workstation, network computer, a consumer device, application server, mobile telephone, or some other type of computing device.

As shown, computer system 1000 includes one or more processors 1010, which may include multiple cores coupled to a system memory 1020 via an input/output (I/O) interface 1030. Computer system 1000 further includes a network interface 1040 coupled to I/O interface 1030. In some embodiments, computer system 1000 may be a uniprocessor system including one processor 1010, or a multiprocessor system including several processors 1010a-n, as shown. The processors 1010 may be any suitable processors capable of executing instructions. For example, in various embodiments, processors 1010 may implement one of a number of instruction set architectures (ISAs), such as the x86, PowerPC, SPARC, or MIPS ISA.

As shown, the computer system 1000 may also include one or more network communication devices (e.g., network interface 1040) for communicating with other systems and/or components over a communications network. For example, an instance of an application executing on computer system 1000 may use network interface 1040 to communicate with another server application executing on another computer system, as described herein.

As shown, computer system 1000 may use its network interface 1040 to communicate with one or more other devices 1060, such as persistent storage devices and/or one or more I/O devices. In some embodiments, some of these other devices may be implemented locally on the computer system 1000, accessible via the I/O interface 1030. In various embodiments, persistent storage devices may include disk drives, tape drives, solid state memory, other mass storage devices, or any other persistent storage device. The computer system 1000 may store instructions and/or data in persistent storage devices and retrieve the stored instruction and/or data as needed.

As shown, the computer system 1000 may include one or more system memories 1020 that store instructions and data accessible by processor(s) 1010. In various embodiments, system memories 1020 may be implemented using any suitable memory technology, (e.g., one or more of cache, static random-access memory (SRAM), DRAM, RDRAM, EDO RAM, DDR 10 RAM, synchronous dynamic RAM (SDRAM), EEPROM, non-volatile/Flash-type memory, etc.). The system memory 1020 may be used to store code 1025 or executable instructions to implement the methods and techniques described herein. For example, the executable instructions may include instructions to implement a network scanner (including associated sub-components: a network latency component; a dynamic RTT timeout value; RTT parameters; and a statistics components). The system memory 1020 may also be used to store data 1026 needed or produced by the executable instructions. For example, the in-memory data 1026 may include security event data 126, security policy data 128, and request data 118, as discussed with respect to FIG. 1.

In some embodiments, some of the code 1025 or executable instructions may be persistently stored on the computer system 1000 and may have been loaded from external storage media. The persistent storage of the computer system 1000 and the external media are examples of non-transitory computer-readable storage media, which may be used to store program instructions to be executed by the computer system 1000. A non-transitory computer-readable storage medium may provide the capability to store information in a form readable by a machine (e.g., computer system 1000). Non-transitory computer-readable media may include storage media such as magnetic or optical media, disk or DVD/CD-ROM devices, archival tapes, network-attached storage systems, or other computer systems.

In some embodiments, the I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing, or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

In some embodiments, the network interface 1040 may allow data to be exchanged between computer system 1000 and other devices attached to a network. The network interface 1040 may also allow communication between computer system 1000 and various I/O devices and/or remote storage systems. Input/output devices may, in some embodiments, include one or more display terminals, keyboards, keypads, touchpads, scanning devices, voice or optical recognition devices, or any other devices suitable for entering or retrieving data by one or more computer systems. Multiple input/output devices may be present in computer system 1000 or may be distributed on various nodes of a distributed system that includes computer system 1000.

In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). In some embodiments, the network interface 1040 may support communication via telecommunications/telephony networks such as analog voice networks or digital fiber communications networks, via storage area networks such as Fibre Channel SANs, or via any other suitable type of network and/or protocol.

In some implementations, advantages and features of the present disclosure may be further described by the following 20 statements.

1. A method comprising: determining, with respect to a cloud compute environment, audit log data indicative of a domain of operational activity; determining, based on the audit log data, one or more factors associated with data features; determining, based on the one or more factors, one or more changes to state data associated with a domain specific graph; determining, based on the domain specific graph and the one or more changes to the state data, detection data indicative of anomalous behavior associated with a cyberattack; and generating, based on the detection data, an alert indicative of the cyberattack.

2. The method of any of the preceding statements, wherein the domain specific graph comprises a probabilistic graph.

3. The method of any of the preceding statements, further comprising: determining, based on the anomalous behavior, one or more operations that are associated with the cyberattack, wherein the alert is indicative of the set of operations.

4. The method of any of the preceding statements, further comprising: determining, based on the detection data and on the audit log data, one or more resources associated with the cyberattack.

5. The method of any of the preceding statements, further comprising: determining, based on the detection data, credential data that has been compromised by the cyberattack.

6. The method of any of the preceding statements, further comprising: determining, based on additional audit log data, one or more updates to the domain specific graph.

7. The method of any of the preceding statements, further comprising: determining, based on suppressing additional detection data associated with additional anomalous behavior, one or more updates that result in the domain specific graph to not be indicative of a cyberattack for operational activity similar to operational activity associated with the additional anomalous data.

8. A system comprising: a memory storing executable instructions; and one or more processors that execute the executable instructions to: determine, with respect to a cloud compute environment, audit log data indicative of a domain of operational activity; determine, based on the audit log data, one or more factors associated with data features; determine, based on the one or more factors, one or more changes to state data associated with a domain specific graph; determine, based on the domain specific graph and the one or more changes to the state data, detection data indicative of anomalous behavior associated with a cyberattack; and generate, based on the detection data, an alert indicative of the cyberattack.

9. The system of any of the preceding statements, wherein the domain specific graph comprises a probabilistic graph.

10. The system of any of the preceding statements, wherein the one or more processors further execute the executable instructions to: determine, based on the anomalous behavior, one or more operations that are associated with the cyberattack, wherein the alert is indicative of the set of operations.

11. The system of any of the preceding statements, wherein the one or more processors further execute the executable instructions to: determine, based on the detection data and on the audit log data, one or more resources associated with the cyberattack.

12. The system of any of the preceding statements, wherein the one or more processors further execute the executable instructions to: determine, based on the detection data, credential data that has been compromised by the cyberattack.

13. The system of any of the preceding statements, wherein the one or more processors further execute the executable instructions to: determine, based on additional audit log data, one or more updates to the domain specific graph.

14. The system of any of the preceding statements, wherein the one or more processors further execute the executable instructions to: determine, based on suppressing additional detection data associated with additional anomalous behavior, one or more updates that result in the domain specific graph to not be indicative of a cyberattack for operational activity similar to operational activity associated with the additional anomalous data.

15. One or more non-transitory computer-accessible storage media storing executable instructions that, when executed by one or more processors, cause a computer system to: determine, with respect to a cloud compute environment, audit log data indicative of a domain of operational activity; determine, based on the audit log data, one or more factors associated with data features; determine, based on the one or more factors, one or more changes to state data associated with a domain specific graph; determine, based on the domain specific graph and the one or more changes to the state data, detection data indicative of anomalous behavior associated with a cyberattack; and generate, based on the detection data, an alert indicative of the cyberattack.

16. The non-transitory computer-accessible storage media of any of the preceding statements, wherein the domain specific graph comprises a probabilistic graph.

17. The non-transitory computer-accessible storage media of any of the preceding statements, wherein the executable instructions, when executed by the one or more processors, further cause the computer system to: determine, based on the anomalous behavior, one or more operations that are associated with the cyberattack, wherein the alert is indicative of the set of operations.

18. The non-transitory computer-accessible storage media of any of the preceding statements, wherein the executable instructions, when executed by the one or more processors, further cause the computer system to: determine, based on the detection data and on the audit log data, one or more resources associated with the cyberattack.

19. The non-transitory computer-accessible storage media of any of the preceding statements, wherein the executable instructions, when executed by the one or more processors, further cause the computer system to: determine, based on the detection data, credential data that has been compromised by the cyberattack.

20. The non-transitory computer-accessible storage media of any of the preceding statements, wherein the executable instructions, when executed by the one or more processors, further cause the computer system to: determine, based on additional audit log data, one or more updates to the domain specific graph.

In some implementations, additional advantages and features of the present disclosure may be further described by the following 20 statements.

1. A method comprising: determining, based on first audit log data, a plurality of baseline profiles associated with operational activity within a cloud compute environment, wherein the plurality of baseline profiles is associated with a probabilistic graph; determining, based on second audit log data, one or more updates to the probabilistic graph; determining, based on third audit log data and on one or more probabilistic dependencies associated with the probabilistic graph, a number of deviations of operational activity; determining, based on the number of deviations being greater than a threshold value, detection data indicative of a cyberattack; and generating, based on the detection data, an alert indicative of the cyberattack.

2. The method of any of the preceding statements, wherein the probabilistic graph comprises a Bayesian Belief Network.

3. The method of any of the preceding statements, wherein the detection data is based on two or more combinations of profile deviations associated with the plurality of baseline profiles.

4. The method of any of the preceding statements, wherein the detection data is indicative of one or more resources associated with the cyberattack.

5. The method of any of the preceding statements, wherein the detection data is indicative of credential data associated with the cyberattack.

6. The method of any of the preceding statements, further comprising: determining, based on additional audit log data, one or more updates to the probabilistic graph.

7. The method of any of the preceding statements, further comprising: determining, based on suppressing additional detection data associated with additional anomalous behavior, one or more updates that result in the probabilistic graph to not be indicative of a cyberattack for operational activity similar to operational activity associated with the additional anomalous data.

8. A system comprising: a memory storing executable instructions; and one or more processors that execute the executable instructions to: determine, based on first audit log data, a plurality of baseline profiles associated with operational activity within a cloud compute environment, wherein the plurality of baseline profiles is associated with a probabilistic graph; determine, based on second audit log data, one or more updates to the probabilistic graph; determine, based on third audit log data and on one or more probabilistic dependencies associated with the probabilistic graph, a number of deviations of operational activity; determine, based on the number of deviations being greater than a threshold value, detection data indicative of a cyberattack; and generate, based on the detection data, an alert indicative of the cyberattack.

9. The system of any of the preceding statements, wherein the probabilistic graph comprises a Bayesian Belief Network.

10. The system of any of the preceding statements, wherein the detection data is based on two or more combinations of profile deviations associated with the plurality of baseline profiles.

11. The system of any of the preceding statements, wherein the detection data is indicative of one or more resources associated with the cyberattack.

12. The system of any of the preceding statements, wherein the detection data is indicative of credential data associated with the cyberattack.

13. The system of any of the preceding statements, wherein the one or more processors further execute the executable instructions to: determine, based on additional audit log data, one or more updates to the probabilistic graph.

14. The system of any of the preceding statements, wherein the one or more processors further execute the executable instructions to: determine, based on suppressing additional detection data associated with additional anomalous behavior, one or more updates that result in the probabilistic graph to not be indicative of a cyberattack for operational activity similar to operational activity associated with the additional anomalous data.

15. One or more non-transitory computer-accessible storage media storing executable instructions that, when executed by one or more processors, cause a computer system to: determine, based on first audit log data, a plurality of baseline profiles associated with operational activity within a cloud compute environment, wherein the plurality of baseline profiles is associated with a probabilistic graph; determine, based on second audit log data, one or more updates to the probabilistic graph; determine, based on third audit log data and on one or more probabilistic dependencies associated with the probabilistic graph, a number of deviations of operational activity; determine, based on the number of deviations being greater than a threshold value, detection data indicative of a cyberattack; and generate, based on the detection data, an alert indicative of the cyberattack.

16. The non-transitory computer-accessible storage media of any of the preceding statements, wherein the probabilistic graph comprises a Bayesian Belief Network.

17. The non-transitory computer-accessible storage media of any of the preceding statements, wherein the detection data is based on two or more combinations of profile deviations associated with the plurality of baseline profiles.

18. The non-transitory computer-accessible storage media of any of the preceding statements, wherein the detection data is indicative of one or more resources associated with the cyberattack.

19. The non-transitory computer-accessible storage media of any of the preceding statements, wherein the detection data is indicative of credential data associated with the cyberattack.

20. The non-transitory computer-accessible storage media of any of the preceding statements, wherein the executable instructions, when executed by the one or more processors, further cause the computer system to: determine, based on additional audit log data, one or more updates to the probabilistic graph.

Various modifications and changes may be made as would be obvious to a person skilled in the art having the benefit of this disclosure. The various embodiments described herein are meant to be illustrative and not limiting. Many variations, modifications, additions, and improvements are possible. These and other variations, modifications, additions, and improvements may fall within the scope of embodiments as defined in the claims that follow.

What is claimed is:

1. A method for detecting cyberattacks in a cloud compute environment, the method comprising:
   using one or more processors to perform:
      executing one or more audit log services to collect event data generated by one or more services executing in the cloud compute environment to obtain audit log data;
      providing the audit log data to a security platform executing in the cloud compute environment or another cloud compute environment;
      using the security platform to perform:
         determining, based on the audit log data, values for one or more observable factors, wherein the values indicate one or more counts associated with respective events in network traffic in the cloud compute environment, wherein a probabilistic graph has nodes and edges between the nodes, wherein the nodes correspond to factors including the one or more observable factors and one or more other factors, and the edges between the nodes represent probabilistic dependencies between the factors represented by the nodes;
         determining, based on the values for the one or more observable factors that indicate the one or more counts associated with the respective events in the network traffic in the cloud compute environment, one or more changes to state data associated with the one or more other factors in the probabilistic graph;
         determining, based on the probabilistic graph and the one or more changes to the state data associated with the one or more other factors in the probabilistic graph, detection data indicative of anomalous behavior associated with a cyberattack; and
         generating, based on the detection data, an alert indicative of the cyberattack.

2. The method of claim 1, further comprising:
   determining, based on the anomalous behavior, one or more operations that are associated with the cyberattack, wherein the alert is indicative of the one or more operations.

3. The method of claim 1, further comprising:
   determining, based on the detection data and on the audit log data, one or more resources associated with the cyberattack.

4. The method of claim 1, further comprising:
   determining, based on the detection data, credential data that has been compromised by the cyberattack.

5. The method of claim 1, further comprising:
   determining, based on additional audit log data, one or more updates to the probabilistic graph.

6. The method of claim 1, further comprising:
   determining, based on suppressing additional detection data associated with additional anomalous behavior, one or more updates that result in the probabilistic graph to not be indicative of a cyberattack for operational activity similar to operational activity associated with the additional anomalous behavior.

7. The method of claim 1, wherein the cyberattack comprises port scanning, endpoint scanning and/or DNS tunneling.

8. The method of claim 1, wherein the values indicate a count of DNS packets of type TXT observed in the network traffic within a threshold period of time.

9. A system for detecting cyberattacks in a cloud computing environment, the system comprising:
   a memory storing executable instructions; and
   one or more processors that execute the executable instructions to:
      execute one or more audit log services to collect event data generated by one or more services executing in the cloud compute environment to obtain audit log data;
      provide the audit log data to a security platform executing in the cloud compute environment or another cloud compute environment;
      use the security platform to:
         determine, based on the audit log data, values for one or more observable factors, wherein the values indicate one or more counts associated with respective events in network traffic in the cloud compute environment, wherein a probabilistic graph has nodes and edges between the nodes, wherein the nodes correspond to factors including the one or more observable factors and one or more other factors, and the edges between the nodes represent probabilistic dependencies between the factors represented by the nodes;
         determine, based on the values for the one or more observable factors that indicate the one or more counts associated with the respective events in the network traffic in the cloud compute environment, one or more changes to state data associated with the one or more other factors in the probabilistic graph;
         determine, based on the domain specific probabilistic graph and the one or more changes to the state data associated with the one or more other factors in the probabilistic graph, detection data indicative of anomalous behavior associated with a cyberattack; and
         generate, based on the detection data, an alert indicative of the cyberattack.

10. The system of claim 9, wherein the one or more processors further execute the executable instructions to:
    determine, based on the anomalous behavior, one or more operations that are associated with the cyberattack, wherein the alert is indicative of the one or more operations.

11. The system of claim 9, wherein the one or more processors further execute the executable instructions to:
    determine, based on the detection data and on the audit log data, one or more resources associated with the cyberattack.

12. The system of claim 9, wherein the one or more processors further execute the executable instructions to:
    determine, based on the detection data, credential data that has been compromised by the cyberattack.

13. The system of claim 9, wherein the one or more processors further execute the executable instructions to:

determine, based on additional audit log data, one or more updates to the probabilistic graph.

14. The system of claim 9, wherein the one or more processors further execute the executable instructions to:
determine, based on suppressing additional detection data associated with additional anomalous behavior, one or more updates that result in the probabilistic graph to not be indicative of a cyberattack for operational activity similar to operational activity associated with the additional anomalous behavior.

15. One or more non-transitory computer-accessible storage media storing executable instructions that, when executed by one or more processors, cause:
the one or more processors to:
execute one or more audit log services to collect event data generated by one or more services executing in a cloud compute environment to obtain audit log data; and
provide the audit log data to a security platform executing in the cloud compute environment or another cloud compute environment; and
the security platform to:
determine, based on the audit log data, values for one or more observable factors, wherein the values indicate one or more counts associated with respective events in network traffic in the cloud compute environment, wherein a probabilistic graph has nodes and edges between the nodes, wherein the nodes correspond to factors including the one or more observable factors and one or more other factors, and the edges between the nodes represent probabilistic dependencies between the factors represented by the nodes;
determine, based on the values for the one or more observable factors that indicate the one or more counts associated with the respective events in the network traffic in the cloud compute environment, one or more changes to state data associated with the one or more other factors in the probabilistic graph;
determine, based on the probabilistic graph and the one or more changes to the state data associated with the one or more other factors in the probabilistic graph, detection data indicative of anomalous behavior associated with a cyberattack; and
generate, based on the detection data, an alert indicative of the cyberattack.

16. The non-transitory computer-accessible storage media of claim 15, wherein the executable instructions, when executed by the one or more processors, further cause the security platform to:
determine, based on the anomalous behavior, one or more operations that are associated with the cyberattack, wherein the alert is indicative of the one or more operations.

17. The non-transitory computer-accessible storage media of claim 15, wherein the executable instructions, when executed by the one or more processors, further cause the security platform to:
determine, based on the detection data and on the audit log data, one or more resources associated with the cyberattack.

18. The non-transitory computer-accessible storage media of claim 15, wherein the executable instructions, when executed by the one or more processors, further cause the security platform to:
determine, based on the detection data, credential data that has been compromised by the cyberattack.

19. The non-transitory computer-accessible storage media of claim 15, wherein the executable instructions, when executed by the one or more processors, further cause the security platform to:
determine, based on additional audit log data, one or more updates to the probabilistic graph.

* * * * *

UNITED STATES PATENT AND TRADEMARK OFFICE
CERTIFICATE OF CORRECTION

| | | |
|---|---|---|
| PATENT NO. | : 12,008,222 B1 | Page 1 of 1 |
| APPLICATION NO. | : 17/979122 | |
| DATED | : June 11, 2024 | |
| INVENTOR(S) | : Nitzan Niv et al. | |

It is certified that error appears in the above-identified patent and that said Letters Patent is hereby corrected as shown below:

In the Claims

At Column 34, Claim 9, Line 20:
"the cloud compute environment to obtain audit log data;"
Should read:
--the cloud compute environment to obtain audit log data; and--

Signed and Sealed this
Thirteenth Day of August, 2024

Katherine Kelly Vidal
*Director of the United States Patent and Trademark Office*